(12) United States Patent
Nakajima

(10) Patent No.: US 11,916,719 B2
(45) Date of Patent: Feb. 27, 2024

(54) WIRELESS TRANSMISSION DEVICE, WIRELESS RECEPTION DEVICE, REMOTE COMMUNICATION MONITORING SYSTEM AND WIRELESS COMMUNICATION METHOD

(71) Applicant: MITSUBISHI ELECTRIC CORPORATION, Tokyo (JP)

(72) Inventor: Akinori Nakajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 311 days.

(21) Appl. No.: 17/330,880

(22) Filed: May 26, 2021

(65) Prior Publication Data

US 2021/0281459 A1 Sep. 9, 2021

Related U.S. Application Data

(63) Continuation of application No. PCT/JP2018/048567, filed on Dec. 28, 2018.

(51) Int. Cl.
*H04L 27/00* (2006.01)
*H04B 17/345* (2015.01)
*H04L 1/08* (2006.01)
*H04L 7/00* (2006.01)
*H04L 27/26* (2006.01)

(52) U.S. Cl.
CPC ....... *H04L 27/2627* (2013.01); *H04B 17/345* (2015.01); *H04L 1/08* (2013.01); *H04L 7/0033* (2013.01)

(58) Field of Classification Search
None
See application file for complete search history.

(56) References Cited

U.S. PATENT DOCUMENTS 8,929,908 B2 1/2015 Agrawal et al.
9,699,663 B1 * 7/2017 Jovancevic ............. G01S 7/021
2010/0054116 A1 3/2010 Ishii et al.

FOREIGN PATENT DOCUMENTS

| CN | 106716825 B | * | 8/2019 | ............. H04B 1/692 |
| JP | 2004165720 A | * | 6/2004 | |
| JP | 2010-62648 A | | 3/2010 | |
| JP | 4938063 B2 | | 5/2012 | |

(Continued)

OTHER PUBLICATIONS

3GPP TS 36.212 V9.2.0, 3rd Generation Partnership Project; Technical Specification Group Radio Access Network; Evolved Universal Terrestrial Radio Access (E-UTRA); Multiplexing and channel coding (Release 9), Jun. 2020, Total 61 pages.

(Continued)

*Primary Examiner* — Gerald A Smarth
(74) *Attorney, Agent, or Firm* — Birch, Stewart, Kolasch & Birch, LLP

(57) ABSTRACT

A wireless transmission device includes a repetition coding unit that prepares a basic waveform having a length less than a frequency conversion length that is used in a wireless reception device, generates a repetition waveform having a length greater than or equal to the frequency conversion length by repeating the basic waveform a plurality of times, and generates a data frame including the repetition waveform and a known signal.

18 Claims, 24 Drawing Sheets

(56) References Cited

FOREIGN PATENT DOCUMENTS

JP          5430938 B2   3/2014
WO    WO 02/078232 A1  10/2002

OTHER PUBLICATIONS

Thiele et al., "Analysis of the LS Estimation Error for a MIMO System on a Rician Fading Channel", 2013 IEEE 77th Vehicular Technology Conference (VTC Spring), pp. 1-5, 2013, Total 6 pages.
Extended European Search Report dated Nov. 12, 2021 in corresponding European Application No. 18944728.7.
Mika Rinne: "Convergence of Packet Communications Over the Evoled Mobile Networks; Signal Processing and Protocol Performance", Helsinki University of Technology, 2010, XP-55011744A-1, Report 15, pp. 1-280.
Office Action dated Feb. 23, 2022 in corresponding Indian Patent Application No. 202147023524.
Schnell M. et al "A Promising New Wideband Multiple-Access Scheme for Future Mobile Communications Systems", XP009069928, Special Issue, vol. 10, No. 4, Jul.-Aug. 1999, pp. 417-427.

\* cited by examiner

FIG.12
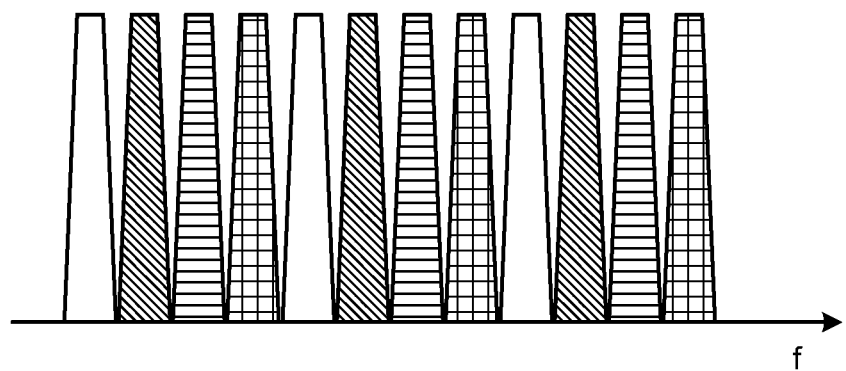
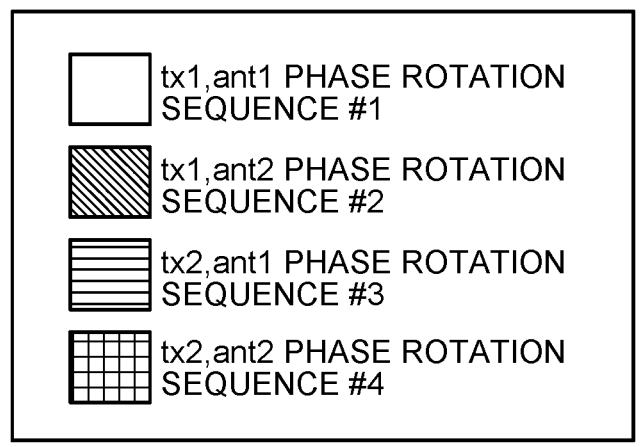
| | |
|---|---|
| ☐ | tx1,ant1 PHASE ROTATION SEQUENCE #1 |
| ▨ | tx1,ant2 PHASE ROTATION SEQUENCE #2 |
| ☰ | tx2,ant1 PHASE ROTATION SEQUENCE #3 |
| ▦ | tx2,ant2 PHASE ROTATION SEQUENCE #4 |

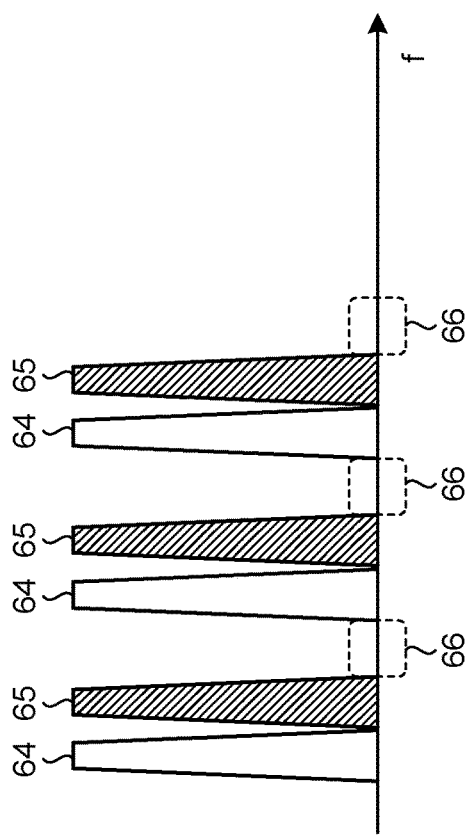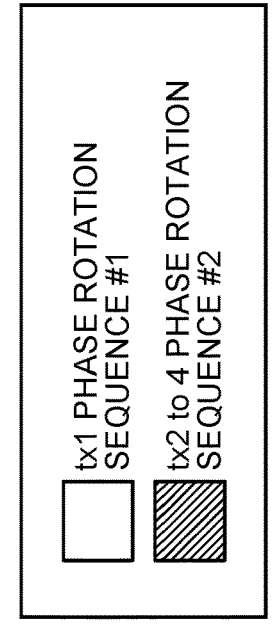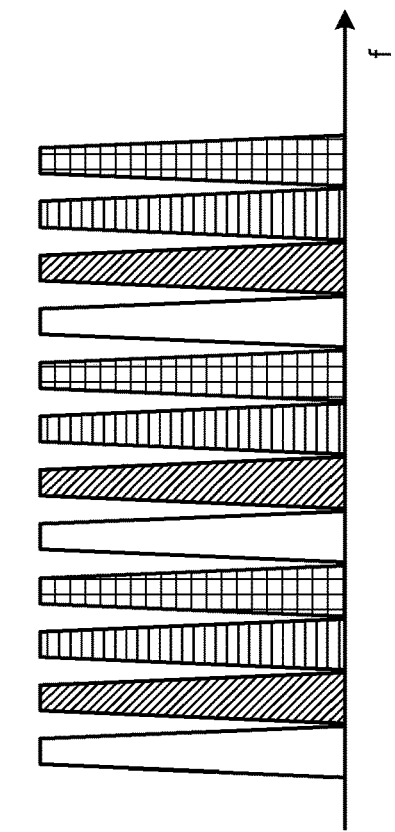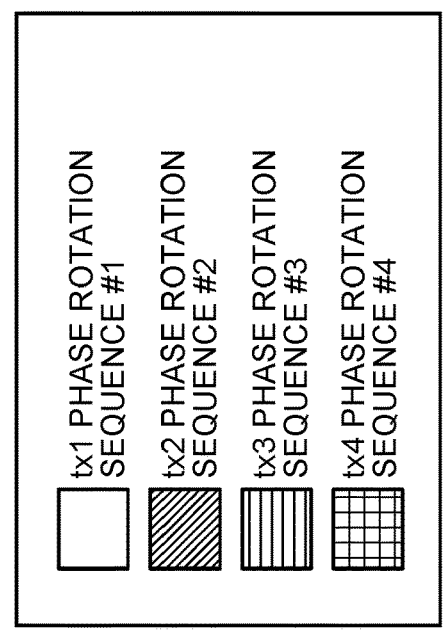
FIG.14

WIRELESS TRANSMISSION DEVICE, WIRELESS RECEPTION DEVICE, REMOTE COMMUNICATION MONITORING SYSTEM AND WIRELESS COMMUNICATION METHOD

CROSS-REFERENCE TO RELATED APPLICATION

This application is a continuation application of International Application PCT/JP2018/048567, filed on Dec. 28, 2018, and designating the U.S., the entire contents of which are incorporated herein by reference.

BACKGROUND OF THE INVENTION

1. Field of the Invention

The disclosure relates to a wireless transmission device, a wireless reception device, a remote communication monitoring system, a wireless communication system, and a wireless communication method in which a reception device receives multiplexed signals from a plurality of transmission devices, to a control circuit, and to a program recording medium.

2. Description of the Related Art

When a plurality of transmission devices simultaneously transmit data using the same frequency, signals from the plurality of transmission devices are multiplexed on the reception side, which causes beat interference. In addition, a cell configuration system that allocates repetition frequencies may suffer cell-to-cell interference between cells using the same frequency. It is desirable that communication be possible even in an interference state. Although it is easy to assess the interference situation by temporarily stopping the system, it is desirable in a system requiring high reliability that the interference situation be assessed while data transmission is continued.

It is possible to assess the interference situation and eliminate the interference while continuing data transmission by utilizing multiple input multiple output (MIMO) signal separation technology or the like. For example, Non Patent Literature 1 to Lars Thiele, Martin Kurras, Michael Olbrich and Kai Borner ("Analysis of the LS Estimation Error for a MIMO System on a Rician Fading Channel," 2013 IEEE 77th Vehicular Technology Conference (VTC Spring), pp. 1-5, 2013) discloses a technique of transmitting different known signals from a plurality of transmission devices or a plurality of antennas, estimating a transmission path matrix on the reception side through inverse matrix processing on the known signals, calculating a signal separation weight using the estimated transmission path matrix, and multiplying the spatially multiplexed reception signal by the signal separation weight, so that the interference can be eliminated, and the state of interference between the plurality of transmission devices can be assessed from the estimated transmission path matrix. The technique described in Non Patent Literature 1 makes it possible to assess the state of interference and eliminate the interference while performing data transmission.

However, if the above-mentioned conventional technique is used in an environment where a reception device moves at high speed, drastic fluctuations occur in propagation paths and the accuracy of transmission path estimation is lowered, which is problematic. As the accuracy of transmission path estimation is lowered, the signal transmission performance is also lowered. This is because the inaccurate transmission path value is used for signal separation through maximum likelihood detection (MLD) or linear equalization.

SUMMARY OF THE INVENTION

In order to solve the above-described problems and achieve the object, a wireless transmission device according to each embodiment of the present disclosure includes a repetition coding unit to prepare a basic waveform having a length less than a frequency conversion length that is used in a wireless reception device, generate a repetition waveform having a length greater than or equal to the frequency conversion length by repeating the basic waveform a plurality of times, and generate a data frame including the repetition waveform and a known signal.

BRIEF DESCRIPTION OF THE DRAWINGS

FIG. 12 is a diagram illustrating a configuration of a reception signal according to a third embodiment of the present disclosure;

FIG. 14 is a diagram for explaining a modification in which a limited number of wireless transmission devices are measured;

DETAILED DESCRIPTION OF THE PREFERRED EMBODIMENTS

Hereinafter, a wireless transmission device, a wireless reception device, a remote communication monitoring system, a wireless communication system, and a wireless communication method according to embodiments of the present disclosure will be described in detail with reference to the drawings.

First Embodiment

Figure 1:
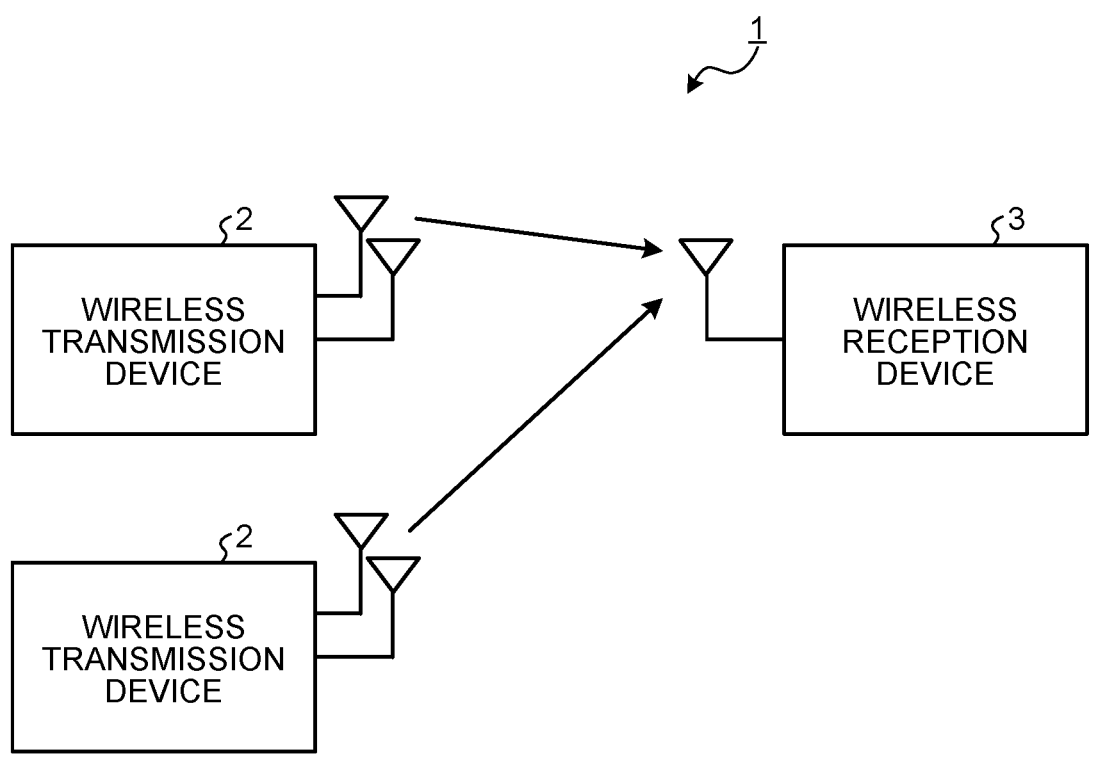
FIG. 1 is a diagram schematically illustrating a configuration of a wireless communication system according to a first embodiment of the present disclosure.

FIG. 1 is a diagram schematically illustrating a configuration of a wireless communication system 1 according to the first embodiment. The wireless communication system 1 includes a plurality of wireless transmission devices 2 and a wireless reception device 3. The wireless reception device 3 receives multiplexed signals transmitted by the plurality of wireless transmission devices 2. An example of the wireless transmission device 2 is a base station, and an example of the wireless reception device 3 is a mobile communication device such as a smartphone. In the following description and drawings, when it is necessary to distinguish the plurality of wireless transmission devices 2 which are sources of signals received by the single wireless reception device 3, the wireless transmission devices 2 may be denoted by a hyphen followed by a number such as 2-1 and 2-2. In addition, the wireless transmission devices 2-1 and 2-2 may be abbreviated as tx1 and tx2, for example.

The wireless transmission device 2 transmits a signal including a known signal, and the wireless reception device 3 can estimate the interference from each wireless transmission device 2 using the known signal included in the reception signal. The plurality of wireless transmission devices 2 can use a common known signal and can simultaneously communicate at the same frequency. Each wireless transmission device 2 includes a plurality of antennas, and the wireless reception device 3 includes at least one antenna. FIG. 1 depicts two wireless transmission devices 2 and one wireless reception device 3 to explain that a plurality of wireless transmission devices 2 transmit data to one wireless reception device 3. However, the wireless communication system 1 may include three or more wireless transmission devices 2 and may include a plurality of wireless reception devices 3.

Figure 2:
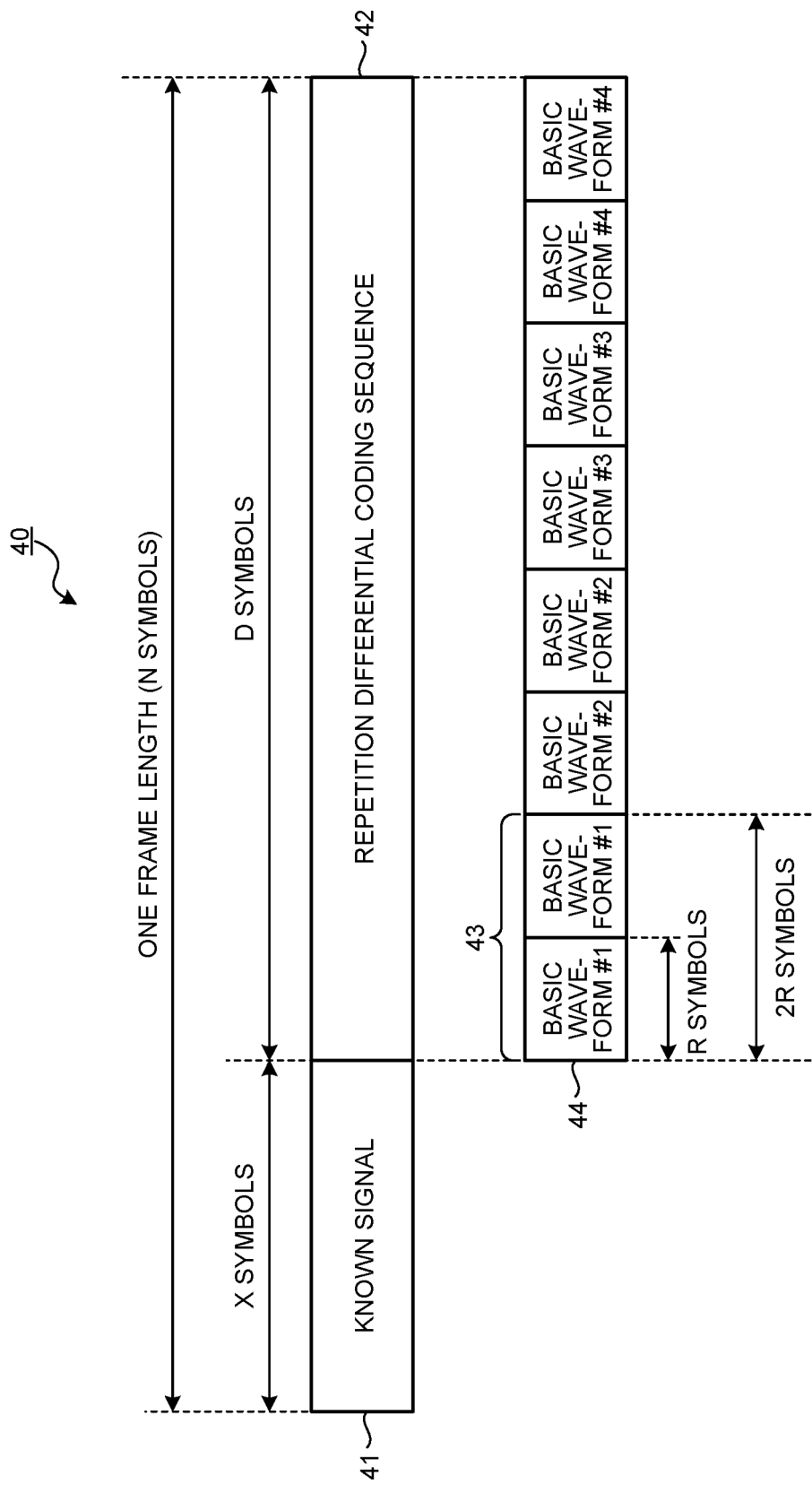
FIG. 2 is a diagram illustrating an exemplary frame structure for the wireless communication system illustrated in FIG. 1.

FIG. 2 is a diagram illustrating an exemplary frame structure for the wireless communication system 1 illustrated in FIG. 1. A data frame 40 illustrated in FIG. 2 is composed of a known signal 41 and a repetition differential coding sequence 42. The repetition differential coding sequences 42 of the plurality of data frames 40 transmitted by the plurality of wireless transmission devices 2 or transmission antennas are different sequences orthogonal to each other on the frequency axis. The repetition differential coding sequence 42 is generated by combining a plurality of repetition waveforms 43, and each repetition waveform 43 is composed of integral-multiple repetitions or non-integral-multiple repetitions of a basic waveform 44. In the example of FIG. 2, the repetition waveform 43 is two repetitions of the basic waveform 44: when the number of symbols of the basic waveform 44 is R, the number of symbols of the repetition waveform 43 is 2R. The repetition differential coding sequence 42 includes four basic waveforms #1 to #4. Therefore, the number of symbols D of the repetition differential coding sequence 42 is represented by $D=R\times2\times4=8R$.

Figure 3:
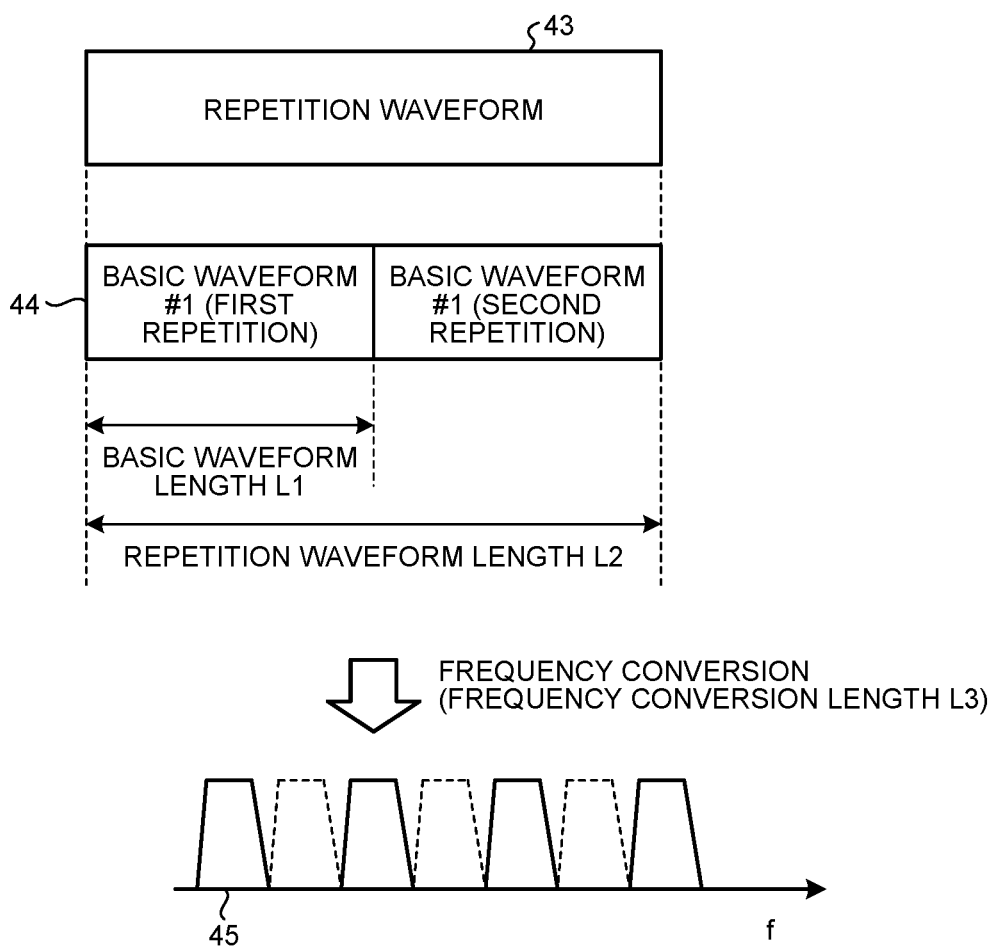
FIG. 3 is an explanatory diagram illustrating a part of the data frame illustrated in FIG. 2.

FIG. 3 is an explanatory diagram illustrating a part of the data frame 40 illustrated in FIG. 2. The wireless transmission device 2 prepares the basic waveform 44 and generates the repetition waveform 43 by repeating the basic waveform 44 a plurality of times. In a case where the data frame 40 includes a plurality of repetition waveforms 43 as illustrated in FIG. 2, the wireless transmission device 2 combines the plurality of repetition waveforms 43 to generate the repetition differential coding sequence 42.

A basic waveform length L1 and the number of repetitions of the basic waveform 44 included in each repetition waveform 43 are determined based on the number of transmission stations to be multiplexed in the wireless communication system 1, the number of transmission antennas, the maximum transmission timing difference between the wireless transmission devices 2, the delay amount of transmission paths, the payload length, and a frequency conversion length L3. The frequency conversion length L3 is determined based on the maximum possible Doppler frequency.

The wireless transmission device 2 makes the basic waveform length L1 less than the frequency conversion length L3 of the wireless reception device 3, and makes a repetition waveform length L2 greater than or equal to the frequency conversion length L3. For example, in the case of (repetition waveform length L2)=(frequency conversion length L3), by frequency-converting the repetition waveform 43, a spectrum 45 can be observed every other basic waveform as illustrated in FIG. 3. In general, large fluctuations in propagation paths with respect to the frequency conversion length L3 lead to a disruption in the orthogonality of each frequency component after frequency conversion, which makes separation into each frequency component difficult. However, the basic waveform length L1, the repetition waveform length L2, and the frequency conversion length L3 that satisfy the above relationship can withstand fluctuations in transmission paths, which enables the reception side to separate each frequency component in the frequency domain even in an environment with large fluctuations in propagation paths such as a high-speed movement environment. The configuration of the wireless transmission device 2 for generating the data frame 40 including the repetition waveform 43 will be described below.

Figure 4:
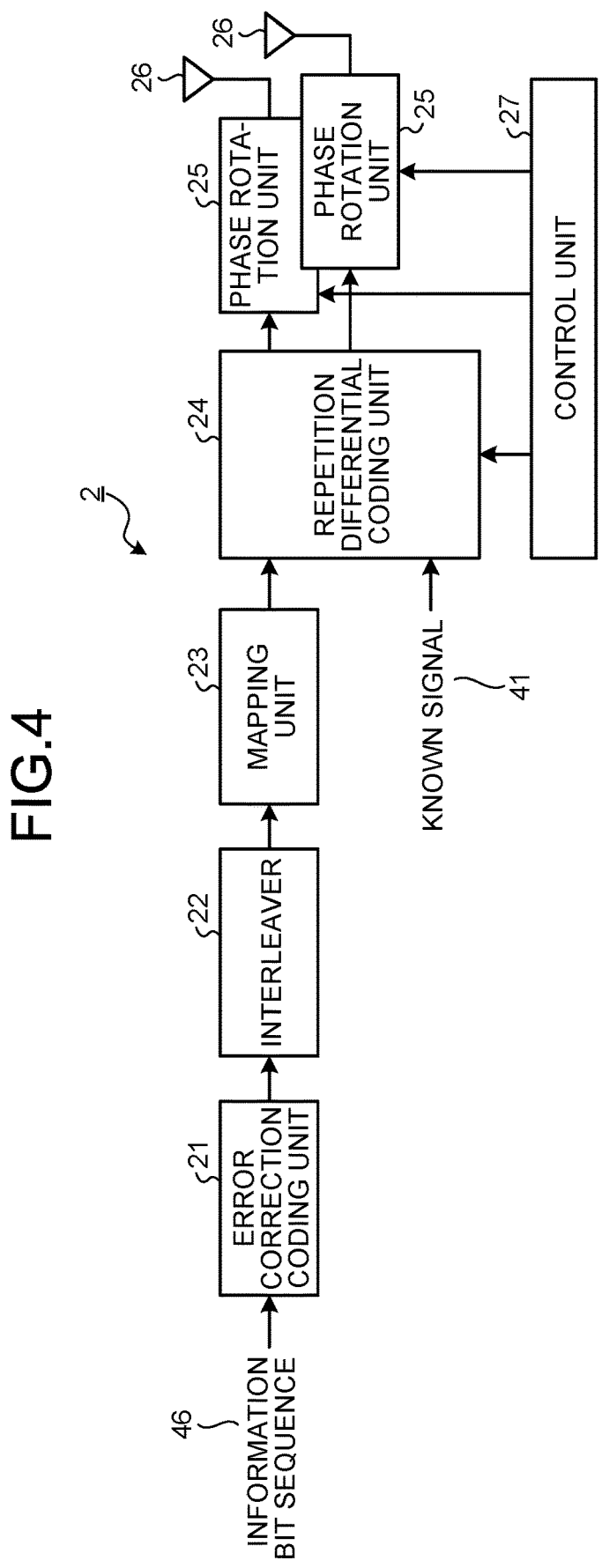
FIG. 4 is a diagram illustrating a functional configuration of the wireless transmission device illustrated in FIG. 1.

FIG. 4 is a diagram illustrating a functional configuration of the wireless transmission device 2 illustrated in FIG. 1. The wireless transmission device 2 includes an error correction coding unit 21, an interleaver 22, a mapping unit 23, a repetition differential coding unit 24, a plurality of phase rotation units 25, a plurality of transmission antennas 26, and a control unit 27.

The error correction coding unit 21 receives input of an information bit sequence 46, performs error correction coding processing on the input information bit sequence 46, and inputs the coded bit sequence to the interleaver 22. The interleaver 22 rearranges the input coded bit sequence, and inputs the rearranged coded bit sequence to the mapping unit 23. The mapping unit 23 performs mapping processing on the input coded bit sequence to obtain primary modulation symbols. The mapping unit 23 inputs the acquired primary modulation symbols to the repetition differential coding unit 24.

The repetition differential coding unit 24 is an example of a repetition coding unit, and performs repetition differential coding processing so as to output the repetition differential coding sequence 42 including the repetition waveform 43 from the input primary modulation symbols. At this time, the repetition differential coding unit 24 inserts the result of differential coding processing on the known signal 41 at a predetermined position. As a result, the repetition differential coding unit 24 prepares the basic waveform 44 having a length less than the frequency conversion length of the wireless reception device 3, generates the repetition waveform 43 having a length greater than or equal to the frequency conversion length by repeating the basic waveform 44 a plurality of times, and generates the data frame 40 including the repetition waveform 43 and the known signal 41.

The repetition differential coding unit 24 performs symbol insertion for start-end processing on the input primary modulation symbols S[k], and performs space-time differential coding processing on the symbol matrix S'[k] obtained as the result of the insertion. Here, S'[k] is a symbol matrix composed of two symbols, and is expressed by Formula (1) below.

[Formula 1]

$$S'[k] = \begin{bmatrix} S'_{k,1} & S'_{k,2} \\ S'^{*}_{k,2} & S'^{*}_{k,1} \end{bmatrix} \quad (1)$$

Here, k is a block time. The symbol matrix S'[k] obtained as the result of the symbol insertion is subjected to the differential coding processing represented by Formula (2) below, whereby the differentially coded symbol matrix C[k] is obtained.

[Formula 2]

$$C[k]=S'[k]C[k-1] \quad (2)$$

Here, C[k] is differentially coded symbols, and is configured as expressed by Formula (3) below.

[Formula 3]

$$C[k] = \begin{bmatrix} C_{k,1} & C_{k,2} \\ -C^{*}_{k,2} & C^{*}_{k,1} \end{bmatrix} \quad (3)$$

Here, in the repetition differential coding unit 24, start-end processing is required for repeating the basic waveform 44, joining the known signal 41 and the repetition waveform 43, and joining the repetition waveforms 43. The start-end processing is a process for preventing the shape of the basic waveform 44 from being deformed in the joining processing above.

Figure 5:
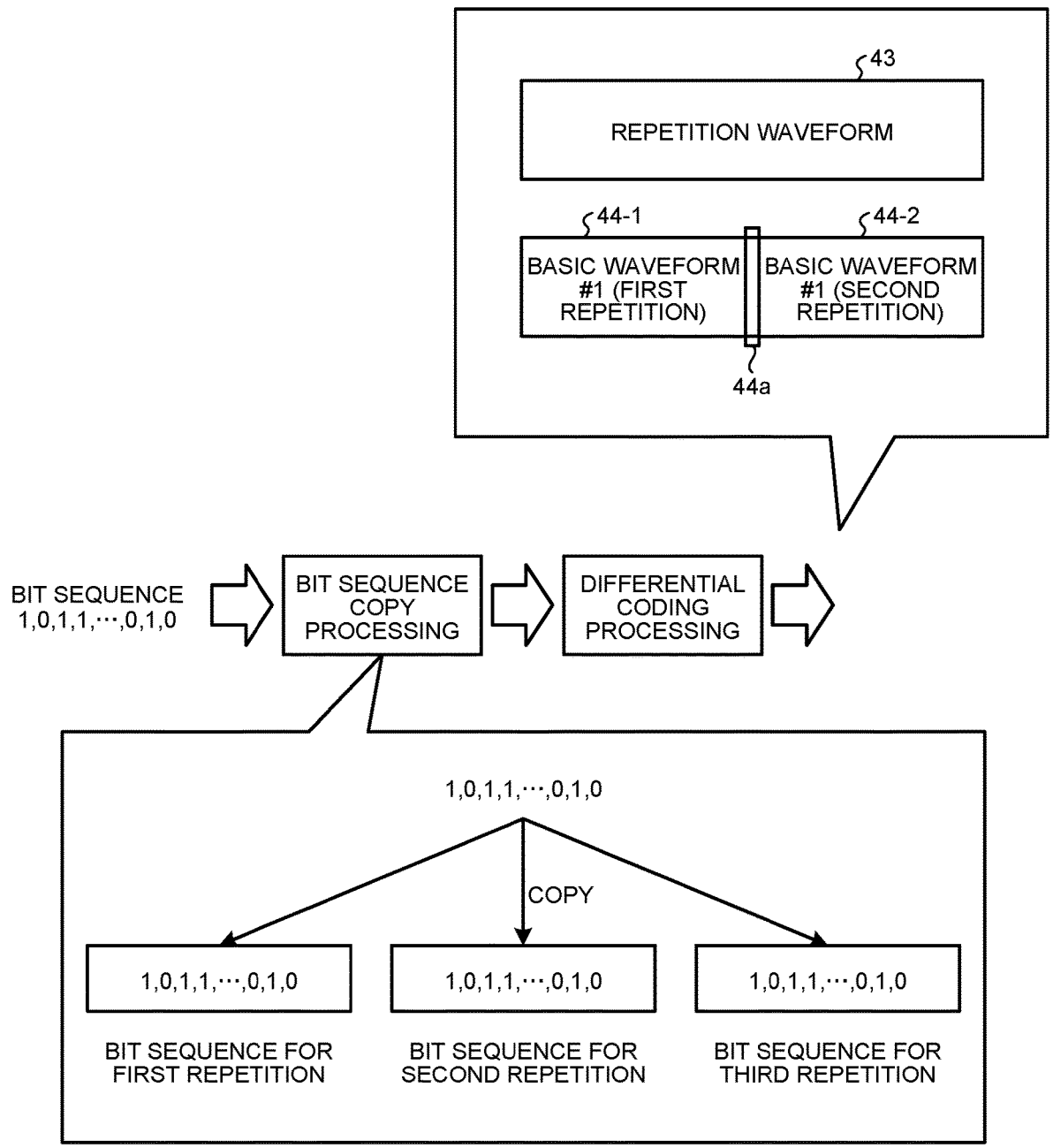
FIG. 5 is a diagram illustrating an example of a case where the repetition differential coding unit illustrated in FIG. 1 does not perform start-end processing.

FIG. 5 is a diagram illustrating an example of a case where the repetition differential coding unit 24 illustrated in FIG. 1 does not perform start-end processing. As described above, differential coding processing is performed using one-time-preceding symbols. If the repetition differential coding unit 24 simply performs bit sequence copy processing and copies the bit sequence as many times as the number of repetitions of the basic waveform 44, the symbol at a predetermined position of each basic waveform 44, specifically, the one-time-preceding symbol that is used for differential coding of the head symbol, differs between the first and second repetitions. Therefore, after the bit sequence is differentially coded, the basic waveform 44-1 of the first repetition and the basic waveform 44-2 of the second repetition differ in shape. In order to avoid such a situation, the repetition differential coding unit 24 performs start-end processing so that the results of differential coding on the head symbols of the respective basic waveforms 44 have the same value.

Figure 6:
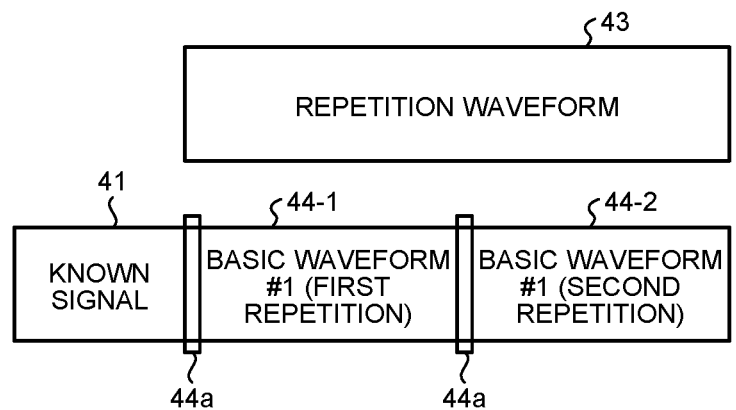
FIG. 6 is a diagram for explaining start-end processing that is performed by the repetition differential coding unit illustrated in FIG. 1.

FIG. 6 is a diagram for explaining start-end processing that is performed by the repetition differential coding unit 24 illustrated in FIG. 1. The repetition differential coding unit 24 adjusts a head symbol 44a of each basic waveform 44 included in the repetition waveform 43 such that the differentially coded sequence maintains the repetition waveform shape.

At the head symbol 44a of each basic waveform 44, the repetition differential coding unit 24 sets the symbol matrix S'[k] with an adjusted symbol inserted therein to the inverse matrix $C^H[k-1]$ of the one-time-preceding differentially coded matrix C[k−1]. By adjusting the head symbol 44a of each basic waveform 44 through this start-end processing, the head symbols 44a of the respective basic waveforms 44 have the same result of space-time differential coding. Specifically, the symbol matrix C[k] generated as the result of space-time differential coding is expressed by Formula (4) below.

[Formula 4]

$$C[k]=S'[k]C[k-1]=C^H[k-1]C[k-1]=I \quad (4)$$

As can be seen from Formula (4), the differentially coded symbol matrix C[k] obtained through start-end processing is the identity matrix. That is, in order to ensure that the results of differential coding on the plurality of head symbols 44a included in the repetition waveform 43 have the same value, the repetition differential coding unit 24 uses the complex conjugate or Hermitian matrix of the one-time-preceding coded signal or one-block-preceding coded signal to adjust the head symbols 44a such that the differential coding on the head symbols 44a results in the identity matrix.

Note that the above-mentioned start-end processing is a process for space-time differential coding on continuous S'[k]. This is an exemplary process for generating the repetition waveform 43, and other means may be adopted. For example, when the repetition differential coding unit 24 generates the symbol matrix C[k] which is the differential coding matrix of the first repetition of the basic waveform 44 after performing differential coding on the known signal 41, the repetition differential coding unit 24 may not use C[k−1]

which is the result of the differential coding on the known signal 41 but may substitute a known symbol block for C[k−1]. Alternatively, the repetition differential coding unit 24 may substitute a predetermined value for C[k] without performing space-time differential coding to generate the symbol matrix C[k] of the first repetition of the basic waveform 44. In this way, the repetition differential coding unit 24 generates as many differentially coded data frames 40 as the number of transmission antennas 26, and inputs the data frames 40 to the phase rotation units 25 corresponding one-to-one to the transmission antennas 26.

Returning to FIG. 4, the phase rotation unit 25 multiplies the repetition differential coding sequence 42 included in the input data frame 40 by the corresponding phase rotation. The phase rotation sequence $Rot_{tx,\,ant}[t]$ of the ant-th transmission antenna 26 of the tx-th wireless transmission device 2 is expressed by Formula (5) below.

[Formula 5]

$$Rot_{tx,ant}[t] = \exp\left(\frac{2\pi p_{tx,ant}}{2R}\right) \quad (5)$$

Here, $p_{tx,\,ant}$ is the amount of phase rotation change per unit time for the ant-th transmission antenna 26 of the tx-th wireless transmission device 2. The phase rotation unit 25 calculates the phase rotation sequence $Rot_{tx,\,ant}[t]$ using $p_{tx,\,ant}$ provided by the control unit 27.

For the repetition differential coding sequence 42 excluding the known signal 41, the phase rotation unit 25 multiplies each repetition waveform 43 by a different phase rotation sequence $Rot_{tx,\,ant}[t]$. This makes the repetition differential coding sequences 42 that are transmitted by the different transmission antennas 26 orthogonal on the frequency axis. For the sake of simplicity, in this example of multiplex reception from the two wireless transmission devices 2, different phase rotation sequences $Rot_{tx,\,ant}[t]$ are used in the different wireless transmission devices 2, whereas the plurality of transmission antennas 26 of each wireless transmission device 2 are assigned the same phase rotation sequences $Rot_{tx,\,ant}[t]$. However, the phase rotation unit 25 may assign different transmission antennas 26 different phase rotation sequences $Rot_{tx,\,ant}[t]$.

According to the configuration described above, the wireless transmission device 2 transmits the data frame 40 including the repetition waveform 43 in which the basic waveform 44 is repeated a plurality of times. Here, the basic waveform length L1, which is the length of the basic waveform 44 of the data frame 40, is less than the frequency conversion length L3, and the repetition waveform length L2, which is the length of the repetition waveform 43, is greater than or equal to the frequency conversion length L3. In addition, the phase rotation unit 25 multiplies the repetition differential coding sequence 42 by the phase rotation sequences $Rot_{tx,\,ant}[t]$ that differ between the wireless transmission devices 2. Therefore, the repetition differential coding sequences 42 of the signals from the different wireless transmission devices 2 included in the multiplexed signal received by the wireless reception device 3 are orthogonal in the frequency domain.

Figure 7:
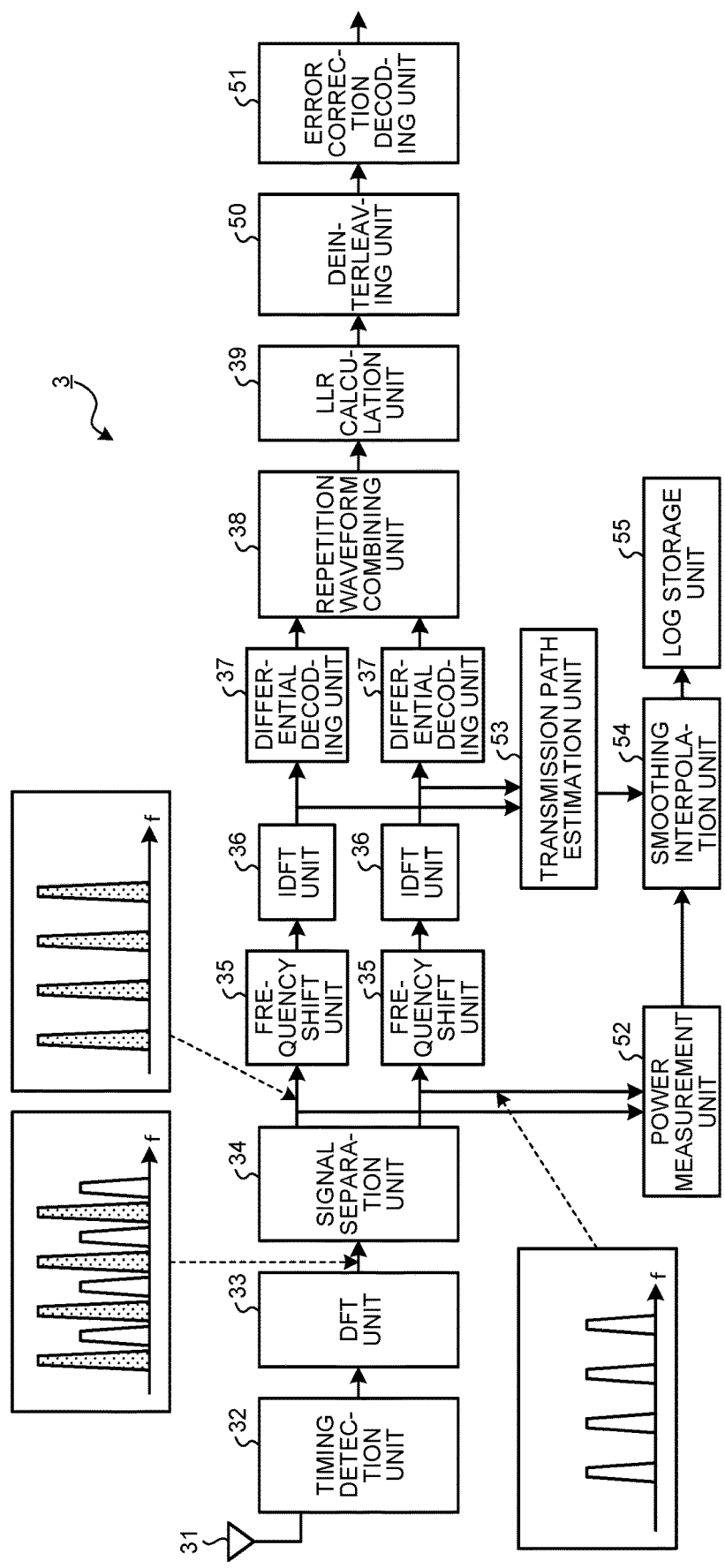
FIG. 7 is a diagram illustrating a functional configuration of the wireless reception device illustrated in FIG. 1.

FIG. 7 is a diagram illustrating a functional configuration of the wireless reception device 3 illustrated in FIG. 1. The wireless reception device 3 includes a reception antenna 31, a timing detection unit 32, a discrete Fourier transform (DFT) unit 33, a signal separation unit 34, a frequency shift unit 35, an inverse DFT (IDFT) unit 36, a differential decoding unit 37, a repetition waveform combining unit 38, a log-likelihood ratio (LLR) calculation unit 39, a deinterleaving unit 50, an error correction decoding unit 51, a power measurement unit 52, a transmission path estimation unit 53, a smoothing interpolation unit 54, and a log storage unit 55. The number of frequency shift units 35, IDFT units 36, differential decoding units 37, and repetition waveform combining units 38 is the same as the number of signals that are superimposed to be received by the wireless reception device 3.

The reception antenna 31 receives superimposed signals from the two wireless transmission devices 2, and inputs the reception signal to the timing detection unit 32. The timing detection unit 32 performs time synchronization and frequency synchronization using the known signal 41 included in the reception signal. The timing detection unit 32 inputs the reception signal to the DFT unit 33. The DFT unit 33 is a frequency conversion unit that converts an input time domain signal into a frequency domain signal. After the conversion, the DFT unit 33 inputs the frequency domain signal to the signal separation unit 34. The signal separation unit 34 separates the frequency component of each wireless transmission device 2 or each transmission antenna 26 from the signal, and inputs the plurality of separated signals one-to-one to the plurality of frequency shift units 35 and to the power measurement unit 52.

The frequency shift unit 35 shifts the frequency of the input signal, and inputs the shifted signal to the IDFT unit 36. The IDFT unit 36 is a time conversion unit that converts an input signal into a time domain signal. After the conversion, the IDFT unit 36 inputs the time domain signal to the differential decoding unit 37 and the transmission path estimation unit 53.

The differential decoding unit 37 performs space-time differential decoding processing on the input time domain signal, and obtains the decoded signal.

Specifically, the decoded matrix $S'_{rx}[k]$ obtained as the result of the space-time differential decoding processing performed by the differential decoding unit 37 is expressed by Formula (6) below.

[Formula 6]

$$S_{rx}'[k] = R[k]R^H[k-1] \quad (6)$$

The differential decoding unit 37 inputs the decoded signal to the repetition waveform combining unit 38. In the first embodiment, the two wireless transmission devices 2 transmit the same data. Therefore, after the differential decoding processing, the repetition waveform combining unit 38 performs the process of combining the obtained repetition waveforms 43 and also performs the process of combining the multiple pieces of identical data transmitted from the two wireless transmission devices 2.

Figure 8:
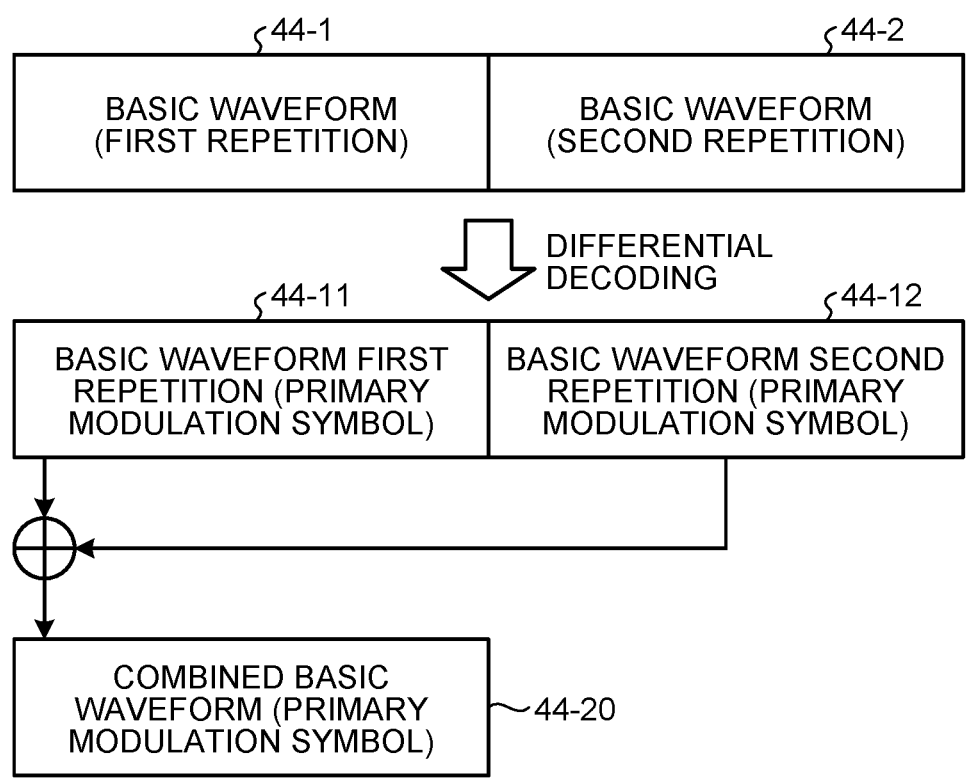
FIG. 8 is a diagram for explaining combining processing that is performed by the repetition waveform combining unit illustrated in FIG. 7.

FIG. 8 is a diagram for explaining combining processing that is performed by the repetition waveform combining unit 38 illustrated in FIG. 7. In the differential decoding unit 37, each of the basic waveforms 44-1 and 44-2 is differentially decoded, whereby the basic waveforms 44-11 and 44-12 are obtained as primary modulation symbols. The repetition waveform combining unit 38 combines the basic waveform 44-11 of the first repetition and the basic waveform 44-12 of the second repetition to obtain a reception signal with the combined basic waveform 44-20. In principle, if the IDFT unit 36 performs time conversion processing with half the number of points as the DFT unit 33, the reception signal of the basic waveform can be obtained. However, in order to reduce the influence of transmission path fluctuations in the repetition waveform section, the IDFT unit 36 may perform time conversion processing with the same number of points as the DFT unit 33, the differential decoding unit 37 may perform space-time differential decoding processing, and then the repetition waveform combining unit 38 may perform combining processing, whereby the reception signal of the basic waveform can be obtained. The repetition waveform combining unit 38 inputs the combined reception signal to the LLR calculation unit 39.

The repetition waveform combining unit 38 inputs the combined reception signal to the LLR calculation unit 39. The LLR calculation unit 39 executes log-likelihood ratio calculation processing using the basic waveform of the two-system reception signal, and inputs the reception signal to the deinterleaving unit 50. The deinterleaving unit 50 performs deinterleave processing on the input reception signal so as to rearrange the bits included in the reception signal in the original order. The deinterleaving unit 50 inputs the deinterleaved reception signal to the error correction decoding unit 51. The error correction decoding unit 51 performs error correction decoding processing on the input reception signal, and acquires a transmission bit sequence.

In the example illustrated in FIG. 7, the wireless reception device 3 includes the repetition waveform combining unit 38, and the IDFT unit 36 performs time conversion processing with the same number of points as the DFT unit 33. However, the present embodiment is not limited to this example. The repetition waveform combining unit 38 may be removed, and the IDFT unit 36 may perform time conversion processing with half the number of points as the DFT unit 33. Generally, the number of points in DFT processing and the number of points in IDFT processing are determined based on the number of repetitions, and the number of points to be handled in IDFT processing is calculated by dividing the number of points in DFT processing by the number of repetitions.

The power measurement unit 52 receives a plurality of separated reception signals from the signal separation unit 34, and calculates at least one of received power, noise power, and interference power using each reception signal. The power measurement unit 52 inputs the measured power value to the smoothing interpolation unit 54.

A plurality of time domain reception signals output by the plurality of IDFT units 36 are input to the transmission path estimation unit 53. The transmission path estimation unit 53 can estimate the transmission path between each transmission antenna 26 and the reception antenna 31 by utilizing the nature of start-end processing. By calculating the power of each transmission path estimated value obtained, the transmission path estimation unit 53 can assess not only the interference situation of the two wireless transmission devices 2 but also that of each transmission antenna 26 of each wireless transmission device 2. In particular, in start-end processing in which the Hermitian matrix of the one-time-preceding differentially coded space-time block is multiplied to obtain the start end of the basic waveform, the differentially coded space-time block is configured as the identity matrix. Therefore, by obtaining the reception signal of the differentially coded space-time block at the start end, the transmission path estimation unit 53 can obtain the transmission path matrix from each transmission antenna 26 without any calculation. Start-end processing may be performed by inserting a predetermined value, in which case the transmission path estimation unit 53 can obtain the transmission path matrix by multiplying the reception signal by the inverse matrix of the known differentially coded space-time block obtained as the result of the fixed insertion. In this case, the noise component contained in the obtained transmission path matrix is large as compared with the case where the start-end block is configured as the identity matrix. The transmission path estimation unit 53 inputs the acquired transmission path matrix to the smoothing interpolation unit 54.

The smoothing interpolation unit 54 performs smoothing processing and interpolation processing on the power value input from the power measurement unit 52. For example, in a case where the plurality of repetition waveforms 43 in one frame are multiplied by the same phase rotation sequence, the spectrum of each wireless transmission device 2 is observed at the same frequency. The smoothing interpolation unit 54 can perform smoothing processing using a moving average or the like. For the frequencies at which no spectrum is observed, the smoothing interpolation unit 54 performs interpolation so that the frequency response in the occupied band can be assessed. In this way, the smoothing interpolation unit 54 calculates a moving average or performs interpolation processing in the time axis direction and the frequency axis direction, and stores the processed power value in the log storage unit 55.

The smoothing interpolation unit 54 also receives a transmission path matrix from the transmission path estimation unit 53. In the same manner as on the power value, the smoothing interpolation unit 54 can perform smoothing processing on the transmission path matrix by performing a moving average process in the time domain, and accumulate the history. Note that each of the power measurement unit 52, the transmission path estimation unit 53, and the smoothing interpolation unit 54 is an example of a measurement unit that measures at least one of power, noise power, interference power, and a transmission path matrix from each of a plurality of frequency domain signals. These measurement units record and accumulate the history of measurement results in the log storage unit 55.

In a case where the plurality of repetition waveforms 43 in one frame are multiplied by the same phase rotation sequence, increasing the number of repetitions results in a large spectrum interval and accordingly in a large interpolation error, which is problematic. On the other hand, in a case where the plurality of repetition waveforms 43 in one frame are multiplied by different phase rotation sequences, the observed spectrum is frequency-shifted at each repetition waveform 43, leading to a small interpolation error.

Figure 9:
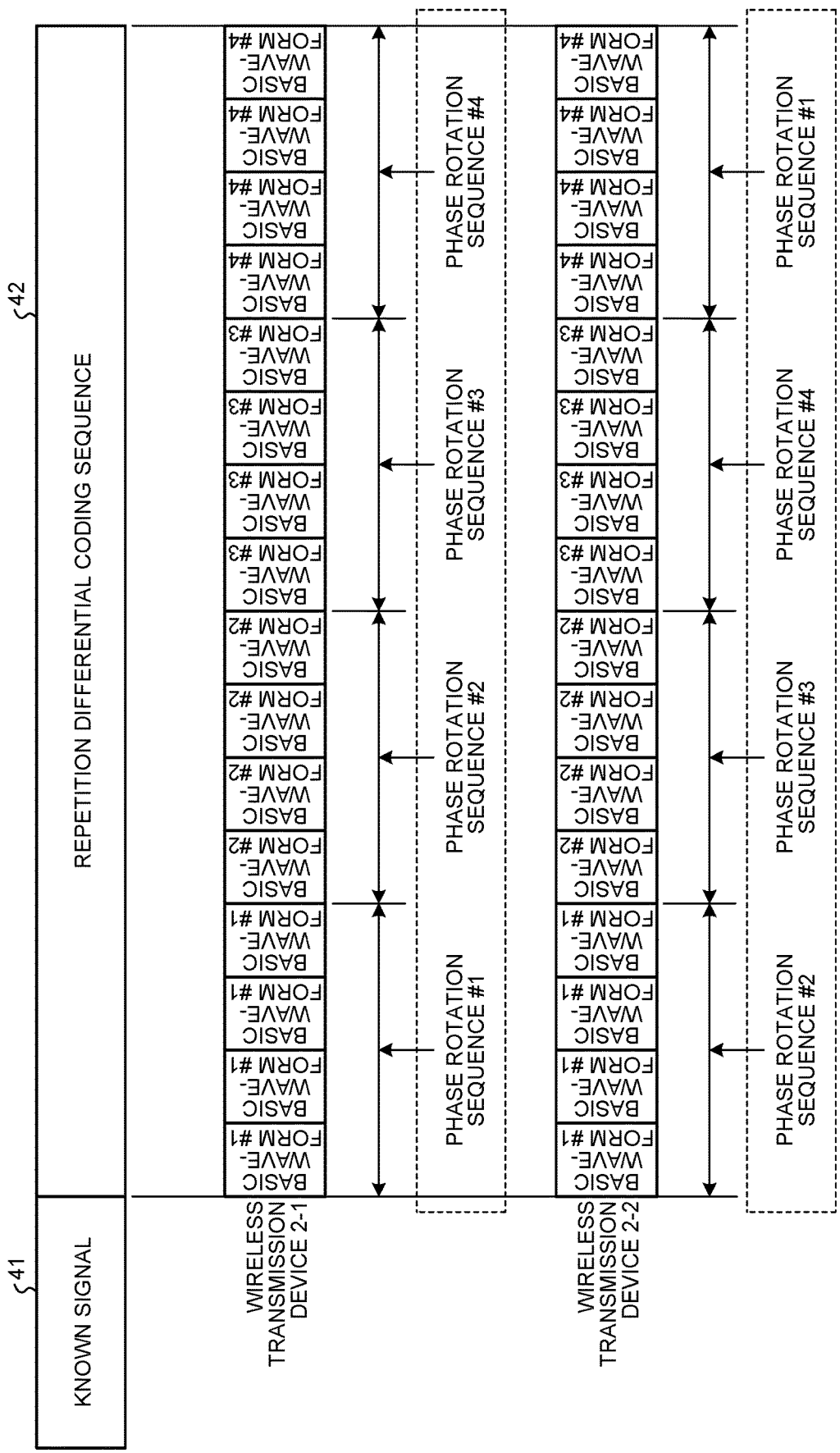
FIG. 9 is a diagram for explaining examples of phase rotation sequences that are used by each wireless transmission device of the wireless communication system illustrated in FIG. 1.

FIG. 9 is a diagram for explaining examples of phase rotation sequences that are used by each wireless transmission device 2 of the wireless communication system 1 illustrated in FIG. 1. The two wireless transmission devices 2-1 and 2-2 transmit the same data to the same wireless reception device 3. At this time, each of the wireless transmission devices 2-1 and 2-2 multiplies the different repetition waveforms 43 by different phase rotation sequences #1 to #4 such that the allocation of the phase rotation sequences to the repetition waveforms 43 always differs between the wireless transmission devices 2-1 and 2-2. In the example of FIG. 9, the wireless transmission device 2-1 multiplies the repetition waveform 43 composed of four basic waveforms #1 by the phase rotation sequence #1, and the wireless transmission device 2-2 multiplies the same repetition waveform 43 by the phase rotation sequence #2. This makes it possible to observe more frequencies than in the case of using one fixed phase rotation sequence, and thus to confirm the frequency response in more detail than in the case of interpolation processing.

In the present embodiment, the wireless reception device 3 receives multiplexed signals from the two wireless transmission devices 2, and the number of repetition waveforms in the reception signals is two. By increasing the number of repetition waveforms of the basic waveform 44, it is possible to define a frequency at which the frequency components of the two wireless transmission devices 2 are not assigned, and to observe noise, unspecified interference, or the like at this frequency. In this case, the power measurement unit 52 computes a moving average in the time axis direction for each untransmitted frequency to calculate the noise power, and sets the reference value to twice the calculated noise power, for example. If a noise power higher than the preset reference value is observed at an untransmitted frequency, the power measurement unit 52 regards this as interference, so that the determination result, i.e. the interference power, determination time, and frequency, can be accumulated in the log storage unit 55.

As described above, in the wireless communication system 1 according to the first embodiment, the wireless transmission device 2 generates the repetition waveform 43 in which the basic waveform 44 having a length less than the frequency conversion length L3 is repeated a plurality of times, where the repetition waveform length L2 of the repetition waveform 43 is greater than or equal to the frequency conversion length L3. Therefore, even in an environment where the wireless reception device 3 moves at high speed, it is possible to improve the accuracy of measurement for measuring the state of interference between the plurality of wireless transmission devices 2 and the plurality of transmission antennas 26 or the state of unspecified interference such as illegal radio waves while performing data transmission.

In addition, the wireless transmission device 2 adjusts the head symbol 44a of each basic waveform 44 included in the repetition waveform 43 such that the differentially coded sequence maintains the repetition waveform shape. Specifically, the repetition differential coding unit 24 ensures that the results of differential coding on the head symbols 44a have the same value. More specifically, the repetition differential coding unit 24 uses the complex conjugate or Hermitian matrix of the one-time-preceding coded signal or one-block-preceding coded signal to adjust the head symbols 44a such that the differential coding on the head symbols 44a results in the identity matrix. As a result, the differentially coded sequence can maintain the repetition waveform shape, and even in an environment where the wireless reception device 3 moves at high speed, it is possible to improve the accuracy of interference estimation for measuring the state of interference between the plurality of wireless transmission devices 2 and the plurality of transmission antennas 26 while performing data transmission.

The technique described in the first embodiment can be effectively applied to area boundaries covered by different transmission stations. In this case, when a plurality of transmission stations transmit the same signal, it is possible to confirm the overlap between the areas by observing the power of the signals orthogonal to each other, whereby the non-sensing area can be reduced without any beat interference. In addition, because the received power of each signal in the above overlap area can be observed individually, the planning and installation of antennas and the like can be easily adjusted, which is beneficial from the viewpoint of maintenance.

When a plurality of transmission stations transmit different signals, interference between transmission stations may occur. However, by orthogonalizing the signals that are transmitted by the different transmission stations, interference between the transmission stations can be reduced so that data transmission can be performed. In addition, by observing the power of each signal, it is possible to confirm the overlap between the areas, which is beneficial from the viewpoint of maintenance in that the planning and installation of antennas and the like can be easily adjusted in consideration of the overlap situation. Furthermore, data accumulated in reception stations such as the power of desired signals, interference power, noise power, and transmission path matrices can be transferred to the server, and the state of the communication system such as interference or changes in reception field strength due to neighboring buildings can be remotely monitored in an operation center. Consequently, radio wave problems can be quickly identified and resolved so that the system can be stabilized. For example, the above benefits can be achieved in both data transmission from base stations to mobile stations and data transmission from mobile stations to base stations.

Second Embodiment

Figure 10:
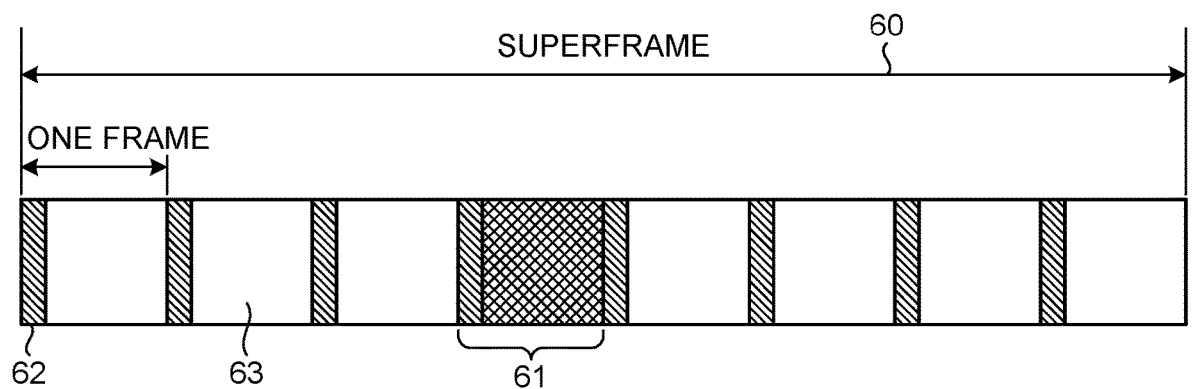
FIG. 10 is a diagram illustrating a frame structure that is used in a second embodiment of the present disclosure.

FIG. 10 is a diagram illustrating a frame structure that is used in the second embodiment. In the second embodiment, data are transmitted using a superframe 60 illustrated in FIG. 10. The superframe 60 is composed of a plurality of frames. The superframe 60 can define a predetermined slot for measuring the interference situation. An interference situation measurement frame 61 is inserted in the predetermined slot. The interference situation measurement frame 61 is composed of multiple types of basic waveforms, where the number of repetitions of each type of basic waveform is two. All frames included in the superframe 60 contain a common synchronous word 62. The synchronous word 62 is a kind of known signal 41. The frames other than the interference situation measurement frame 61 contain a normal data frame 63. Even though the interference situation measurement frame 61 has a lower data rate than the normal data frame 63 by the amount corresponding to the repetition waveform 43, the interference situation measurement frame 61 is effective in preventing a significant decrease in data rate while enabling the assessment of the interference situation. In the present embodiment, the plurality of wireless transmission devices 2 use the same synchronous word 62, but there is no particular limitation.

Figure 11:
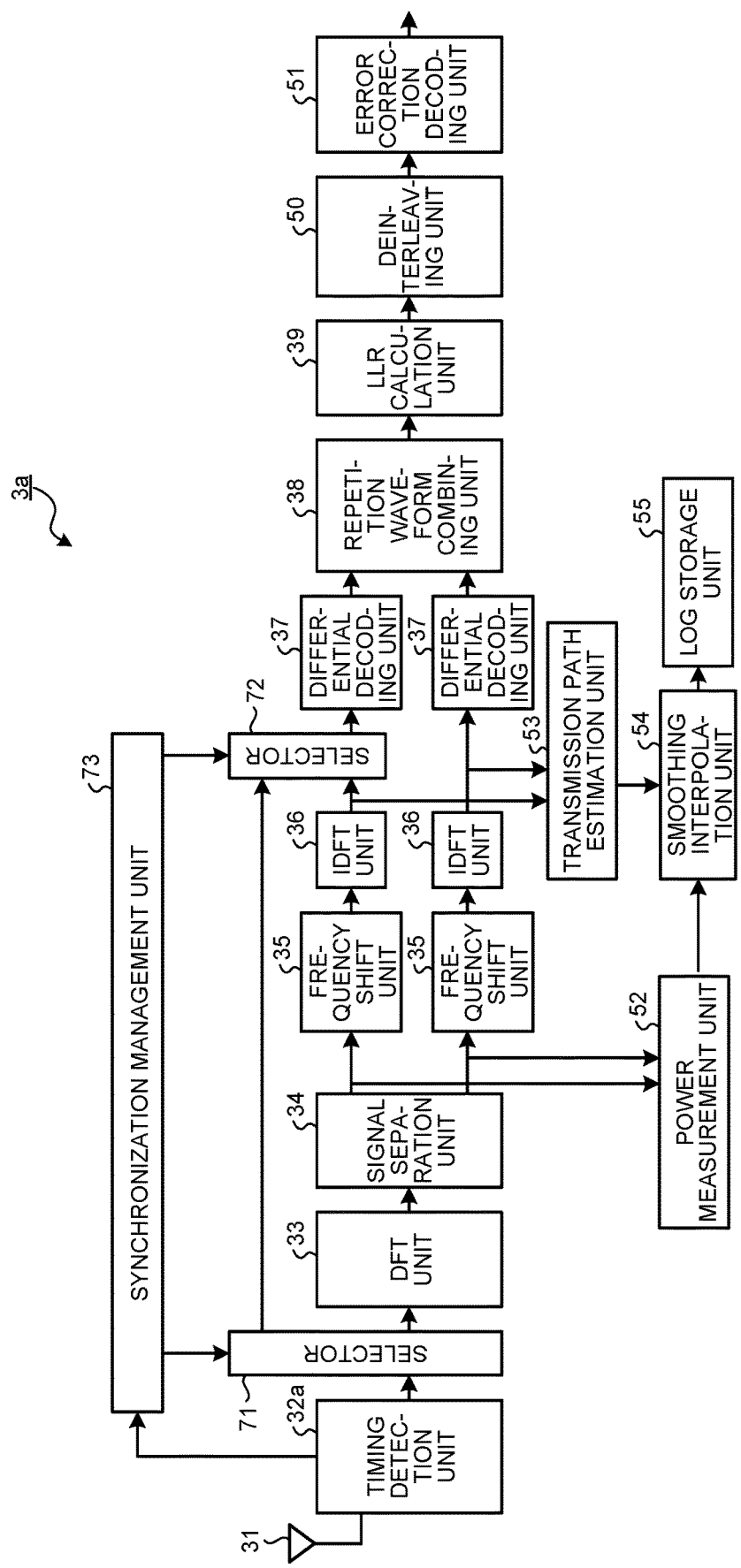
FIG. 11 is a diagram illustrating a configuration of a wireless reception device according to the second embodiment of the present disclosure.

FIG. 11 is a diagram illustrating a configuration of a wireless reception device 3a according to the second embodiment. The wireless reception device 3a includes the reception antenna 31, a timing detection unit 32a, the DFT unit 33, the signal separation unit 34, the frequency shift unit 35, the IDFT unit 36, the differential decoding unit 37, the repetition waveform combining unit 38, the LLR calculation unit 39, the deinterleaving unit 50, the error correction decoding unit 51, the power measurement unit 52, the transmission path estimation unit 53, the smoothing interpolation unit 54, the log storage unit 55, selectors 71 and 72, and a synchronization management unit 73. The number of frequency shift units 35, IDFT units 36, differential decoding units 37, and repetition waveform combining units 38 is the same as the number of signals that are superimposed to be received by the wireless reception device 3a.

The wireless reception device 3a is different from the wireless reception device 3 in that the wireless reception device 3a includes the timing detection unit 32a instead of the timing detection unit 32 of the wireless reception device 3, and further includes the selector 71 provided between the timing detection unit 32a and the DFT unit 33, the selector 72 provided between the IDFT unit 36 and the differential decoding unit 37, and the synchronization management unit 73. Components identical to those of the wireless reception device 3 are denoted by the same reference signs and will not be described in detail. The differences from the wireless reception device 3 will be mainly described below.

The wireless reception device 3a can perform the process of receiving the superframe 60 illustrated in FIG. 10. The timing detection unit 32a detects a frame timing and a superframe timing, and inputs the timing detection result to the synchronization management unit 73. The selectors 71 and 72 have a function of directing the signals to separate processing systems on a frame-by-frame basis as instructed by the synchronization management unit 73. Specifically, the selectors 71 and 72 have a function of directing each frame to either a first processing system or a second processing system. In the first processing system, interference measurement processing is performed by the DFT unit 33, the signal separation unit 34, the frequency shift unit 35, the IDFT unit 36, the power measurement unit 52, the transmission path estimation unit 53, the smoothing interpolation unit 54, and the log storage unit 55. In the second processing system, the above interference measurement processing is not performed.

The synchronization management unit 73 manages the synchronization of the frame and superframe timings according to the input timing detection result. The timing detection result includes information indicating the reception timing of each frame included in the superframe 60. The synchronization management unit 73 can control the selector 71 and the selector 72 according to the timing of receiving the interference situation measurement frame 61 so as to input the interference situation measurement frame 61 to the first processing system.

In this example that involves the two wireless transmission devices 2, a configuration for performing two-system space-time differential decoding processing is prepared. In addition, the two wireless transmission devices 2 transmit the same data orthogonalized at different frequencies. Therefore, the data of the two wireless transmission devices 2 are combined at the time of repetition waveform combining. The wireless reception device 3a only needs to prepare three-system space-time differential decoding processing to receive signals from three wireless transmission devices 2. Further, instead of parallel processing, sequential processing may be repeatedly performed, and the configuration of the wireless reception device 3a can be modified.

As described above, according to the second embodiment, by using a part of the superframe 60 including a plurality of frames as the interference situation measurement frame 61 for wireless communication using the superframe 60, even in an environment where the wireless reception device 3a moves at high speed, it is possible to improve the accuracy of interference estimation for measuring the state of interference between the plurality of wireless transmission devices 2 and the plurality of transmission antennas 26 while performing data transmission. Although it is described in the above example that both data transmission using transmission-coded repetition waveforms and interference state assessment are implemented, there is no particular limitation. Data transmission with the repetition waveforms of transmission-coded sequences can be implemented alone, which is effective in avoiding beat interference due to the transmission of the same data at the same frequency, and in avoiding interference between transmission devices without any transmission bandwidth change in the transmission of different data at the same frequency. This is beneficial in that interference-resistant data transmission can be performed in a high-speed movement environment. Furthermore, interference state assessment may be implemented alone. In this case, by systematically preparing a frame for assessing the interference state in a specific frame as described in the second embodiment, the interference state can be assessed while performing normal data transmission that does not use repetition waveforms.

This facilitates the installation adjustment of antennas, which is beneficial in terms of maintenance. In addition, by constantly and remotely monitoring the state of radio waves, it is possible to detect changes in landscape features such as the construction and demolition of surrounding buildings. Therefore, it is not necessary to conduct direct on-site measurements to deal with problems such as communication interruptions after such problems occur, and it is possible to detect and deal with problems in the communication system in advance.

Third Embodiment

FIG. 12 is a diagram illustrating a configuration of a reception signal according to the third embodiment. In the first and second embodiments described above, the plurality of transmission antennas 26 included in each of the plurality of wireless transmission devices 2 that transmit signals to the single wireless reception device 3 or 3a use the same phase rotation, that is, the same frequency. Alternatively, a plurality of signals that are transmitted by the plurality of transmission antennas 26 may be multiplied by different phase rotation sequences. For example, suppose that each of the two wireless transmission devices 2 includes two transmit antennas 26. In this case, in one frame, if the number of repetitions of the basic waveform 44 is four and four different phase rotation sequences are used, received power can be observed from a total of four transmission antennas 26 separately. Note that the two wireless transmission devices 2 can transmit the same data or different data.

Figure 13:
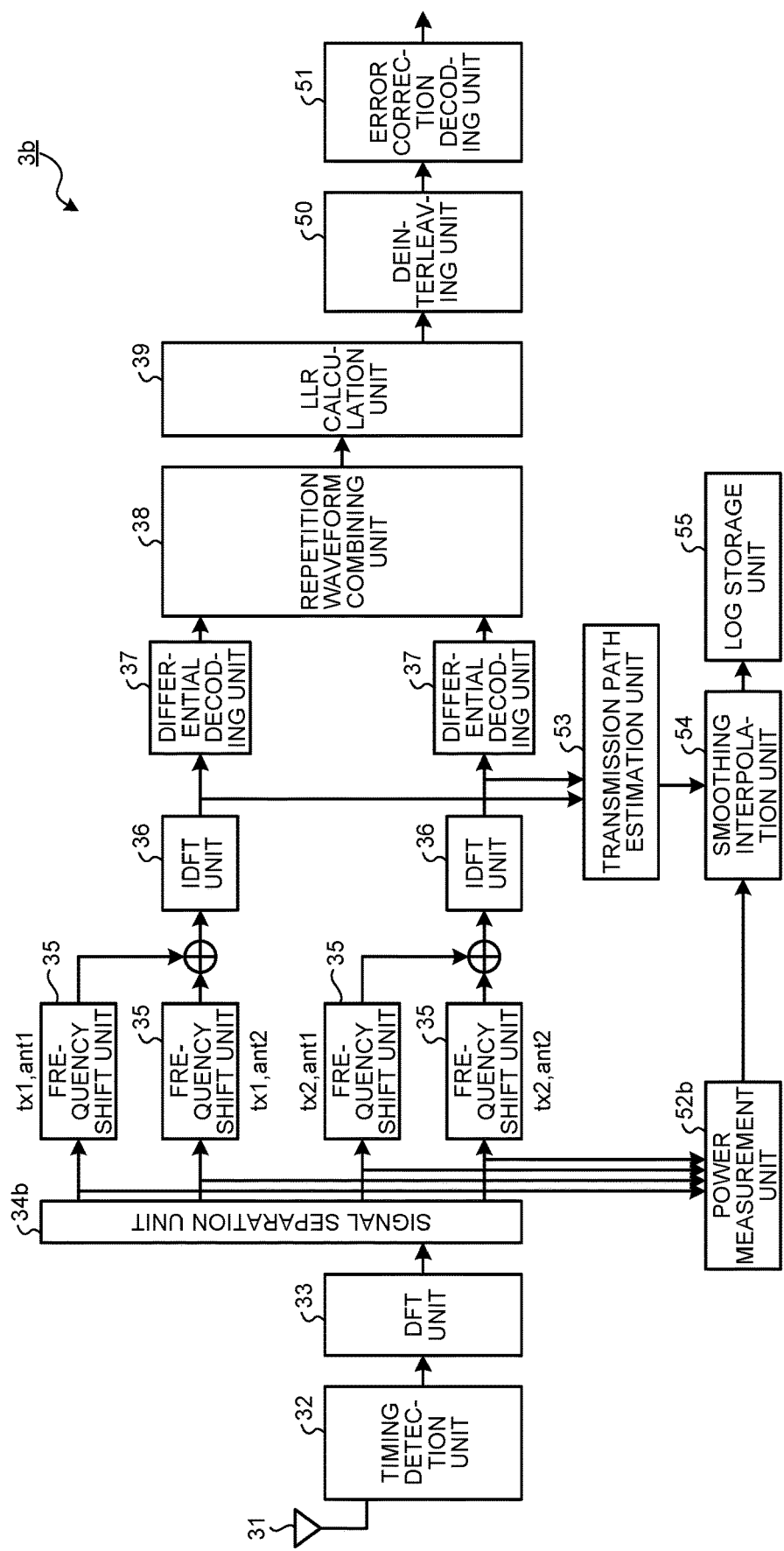
FIG. 13 is a diagram illustrating a configuration of a wireless reception device that receives the signal illustrated in FIG. 12.

FIG. 13 is a diagram illustrating a configuration of a wireless reception device 3b that receives the signal illustrated in FIG. 12. Hereinafter, the differences from the wireless reception device 3 will be mainly described. The wireless reception device 3b includes four frequency shift units 35 and a signal separation unit 34b. The signal separation unit 34b inputs the four separated signals one-to-one to the four frequency shift units 35 and to a power measurement unit 52b. The power measurement unit 52b measures received power for each wireless transmission device 2 and each transmission antenna 26. The signal processed and output by each frequency shift unit 35 is superimposed with the signal derived from the same wireless transmission device 2, and accordingly input to either of the two IDFT units 36. If the two wireless transmission devices 2 transmit different data, these are processed in two systems, each of which involves repetition waveform combining and a series of processes by the LLR calculation unit 39, the deinterleaving unit 50, and the error correction decoding unit 51. If the two wireless transmission devices 2 transmit the same data, these may be processed in the manner described in the first and second embodiments. Specifically, received data from the two wireless transmission devices 2 may be combined through repetition waveform combining and processed in one system consisting of the LLR calculation unit 39, the deinterleaving unit 50, and the error correction decoding unit 51. FIG. 13 depicts a reception configuration for receiving the same data.

In the example illustrated in FIG. 13, the frequency-shifted signals derived from the same wireless transmission device 2 are combined, and the combined signal is converted into a time domain signal so that differential decoding is performed separately for each wireless transmission device 2. However, the present embodiment is not limited to this example. For example, the wireless reception device 3b may include four IDFT units 36 and four differential decoding units 37 so as to perform differential decoding processing separately for each transmission antenna 26.

In the case of assessing the interference situation of signals from a large number of wireless transmission devices 2, it is necessary to increase the number of repetitions of the basic waveform 44 in order to orthogonalize the signals from all the wireless transmission devices 2 in the frequency domain. Further, if idler frequencies for measuring noise, unspecified interference, or the like are required, a larger number of repetitions are required. As the number of repetitions increases, the frequency conversion length also increases. This poses a problem for a high-speed movement environment: the accuracy of measuring the interference situation and the data demodulation performance may deteriorate due to the influence of transmission path fluctuations and the like.

To solve this problem, the plurality of wireless transmission devices 2 may be divided into a measurement target group and a non-measurement target group. Then, the measurement-target wireless transmission device 2 may transmit a signal with a predetermined frequency, whereas the non-measurement-target wireless transmission devices 2 may transmit multiplexed signals with the same frequency, which is different from the frequency of the measurement target. Specifically, the wireless reception devices 3, 3a, and 3b may give up trying to measure received power in one frame from the non-measurement-target wireless transmission devices 2, and may measure received power only from the measurement-target wireless transmission device 2 and distribute the wireless transmission devices 2 to be measured over a plurality of frames. In this case, it is possible to measure received power from the plurality of wireless transmission devices 2 while reducing the number of repetitions of the basic waveform 44.

FIG. 14 is a diagram for explaining a modification in which a limited number of wireless transmission devices 2 are measured. By measuring a limited number of wireless transmission devices 2 instead of all the wireless transmission devices 2, it is possible to not only measure received power from the measurement-target wireless transmission devices 2 but also measure noise and unspecified interference without increasing the number of repetitions. In FIG. 14, tx1 to tx4 mean the wireless transmission devices 2-1 to 2-4, and will be described using the wireless transmission devices 2-1 to 2-4 in the present description.

The signals transmitted by the wireless transmission devices 2-1 to 2-4 illustrated on the left side of FIG. 14 are all orthogonal. In this case, the required number of repetitions is four. On the other hand, in the case of measuring received power from the measurement-target wireless transmission device 2-1, measuring noise and unspecified interference, and distributing the wireless transmission devices 2-1 to 2-4 to be measured over a plurality of frames, a signal region 64 from the measurement-target wireless transmission device 2-1 using the phase rotation sequence #1, a signal region 65 from the non-measurement-target wireless transmission devices 2-2 to 2-4 using the phase rotation sequence #2, and an idler frequency region 66 are required in the frequency domain. Therefore, the required number of repetitions is only three. By allowing this type of multiplexing, the number of repetitions can be reduced. According to the above embodiment, it is possible to additionally assess the radio wave arrival status of each transmission antenna of the transmission stations, which is effective in antenna adjustment or the like, that is, identifying in advance the antenna to be adjusted, i.e. which antenna should be adjusted.

Fourth Embodiment

Figure 15:
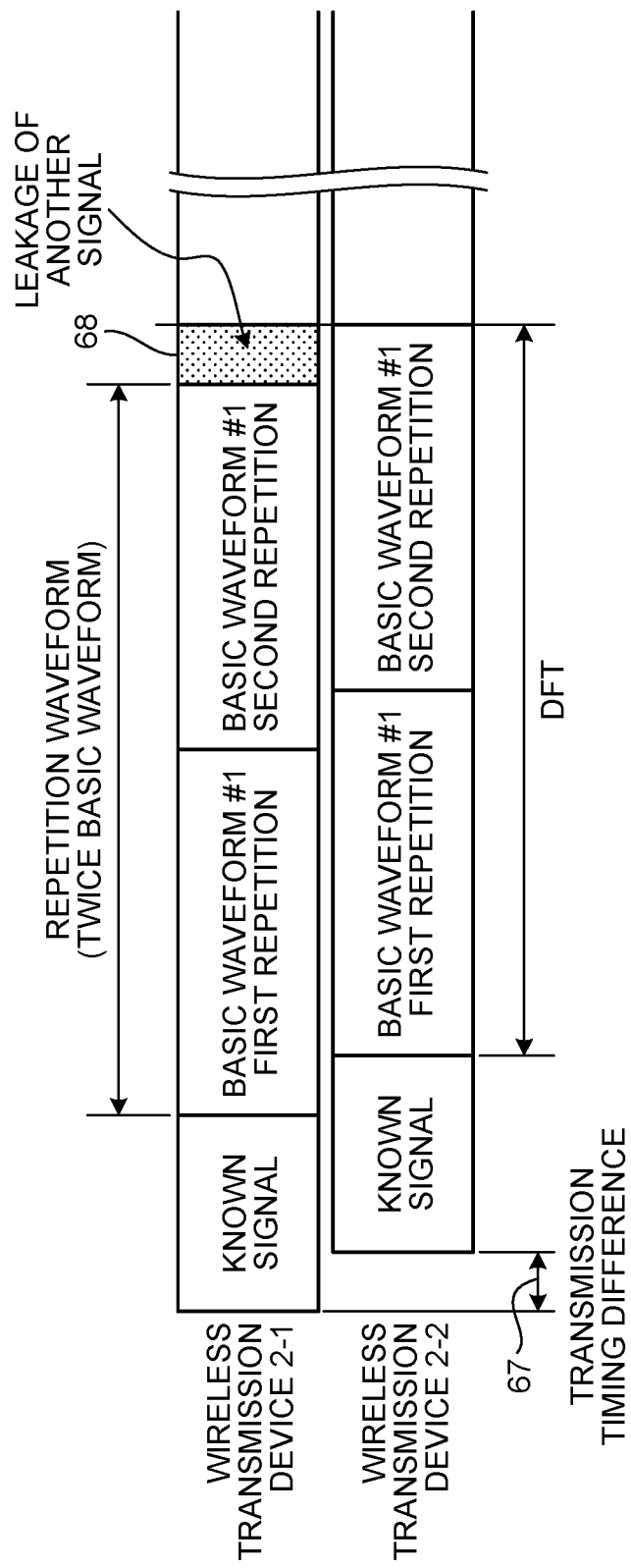
FIG. 15 is a diagram for explaining the problem to be solved by a fourth embodiment of the present disclosure.

FIG. 15 is a diagram for explaining the problem to be solved by the fourth embodiment. Suppose that signals are transmitted from the plurality of wireless transmission devices 2-1 and 2-2 at different timings with a transmission timing difference 67 illustrated in FIG. 15, and interference occurs between the wireless transmission devices 2-1 and 2-2. In this case, if the repetition waveform length is equal to the frequency conversion length as in the first embodiment above, frequency conversion is performed in a manner that involves a part of another signal 68, which reduces the accuracy of data transmission and interference situation measurement.

Figure 16:
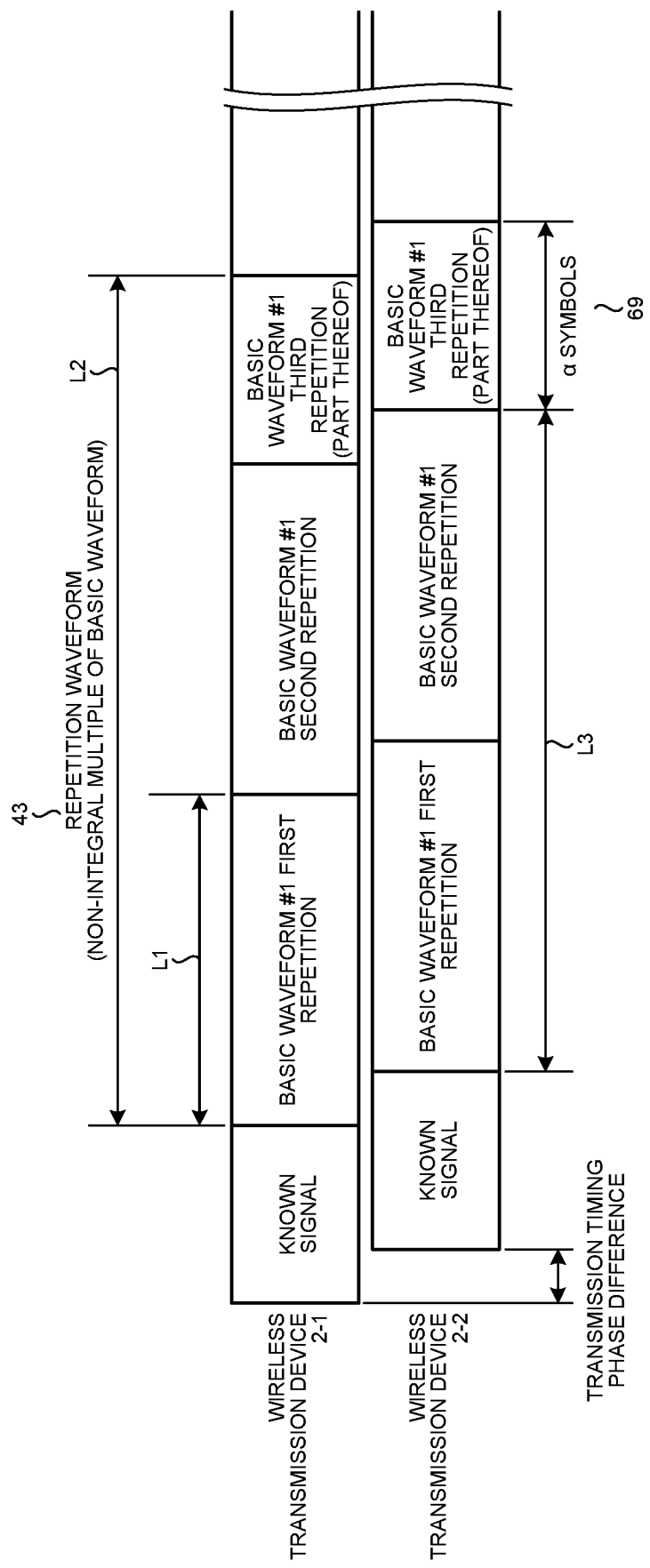
FIG. 16 is a diagram for explaining data frames that are used in the fourth embodiment of the present disclosure.

FIG. 16 is a diagram for explaining data frames that are used in the fourth embodiment. In the present embodiment, the repetition waveform length L2 is greater than twice the basic waveform length L1, and the repetition waveform length L2 is greater than the frequency conversion length L3. This makes it possible to reduce the influence of the transmission timing difference between the wireless transmission devices 2-1 and 2-2, and to prevent a reduction in the accuracy of data transmission and interference situation measurement from each of the wireless transmission devices 2-1 and 2-2.

The wireless transmission devices 2-1 and 2-2 according to the fourth embodiment have the configuration of the wireless transmission device 2 illustrated in FIG. 4 and transmit the same data, and thus will be described below using the reference signs illustrated in FIG. 4. The repetition differential coding unit 24 of the wireless transmission devices 2-1 and 2-2 generates the repetition waveform 43 such that the relationship of (repetition waveform length L2)=(frequency conversion length L3+α) is satisfied. Here, α represents a margin length 69 and satisfies the relationship of α>0. Therefore, the repetition waveform length L2 is (1+α/L3) times the frequency conversion length L3: the repetition waveform is longer than the frequency conversion length L3. If a is not an integral multiple of the basic waveform length L1, the repetition waveform 43 is a fractional waveform with respect to the frequency conversion length L3. The example of FIG. 16 depicts a fractional waveform in which the repetition waveform length L2 is a non-integral multiple of the basic waveform length L1. The repetition waveform 43 is subjected to frequency conversion at a timing that frequency conversion can be performed without leakage of another signal from either the wireless transmission device 2-1 or 2-1. As a result, it is possible to separate the signals from the wireless transmission devices 2-1 and 2-1 in the frequency domain, and to perform the received power measurement and demodulation of each signal.

Figure 17:
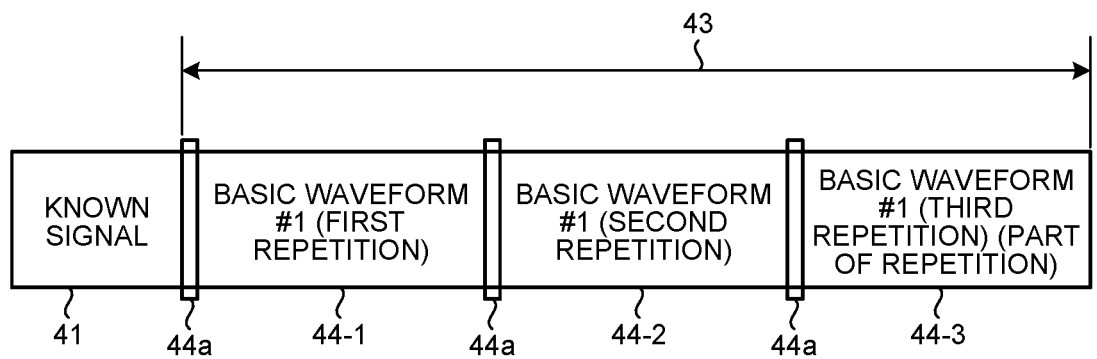
FIG. 17 is a diagram for explaining start-end processing according to the fourth embodiment of the present disclosure.

FIG. 17 is a diagram for explaining start-end processing according to the fourth embodiment. The repetition differential coding unit 24 needs to generate a differential coding sequence corresponding to the repetition waveform length L2. The repetition differential coding unit 24 performs start-end processing by using the one-block-time-preceding differential coding result for the head symbol 44a of each of the basic waveforms 44-1, 44-2, and 44-3 included in the repetition waveform 43. Through this start-end processing, the head symbols 44a have the same result of differential coding. The start-end processing is not limited to the above example, and the repetition differential coding unit 24 may insert a predetermined value as long as the repetition waveform 43 can be generated after the differential coding.

Figure 18:
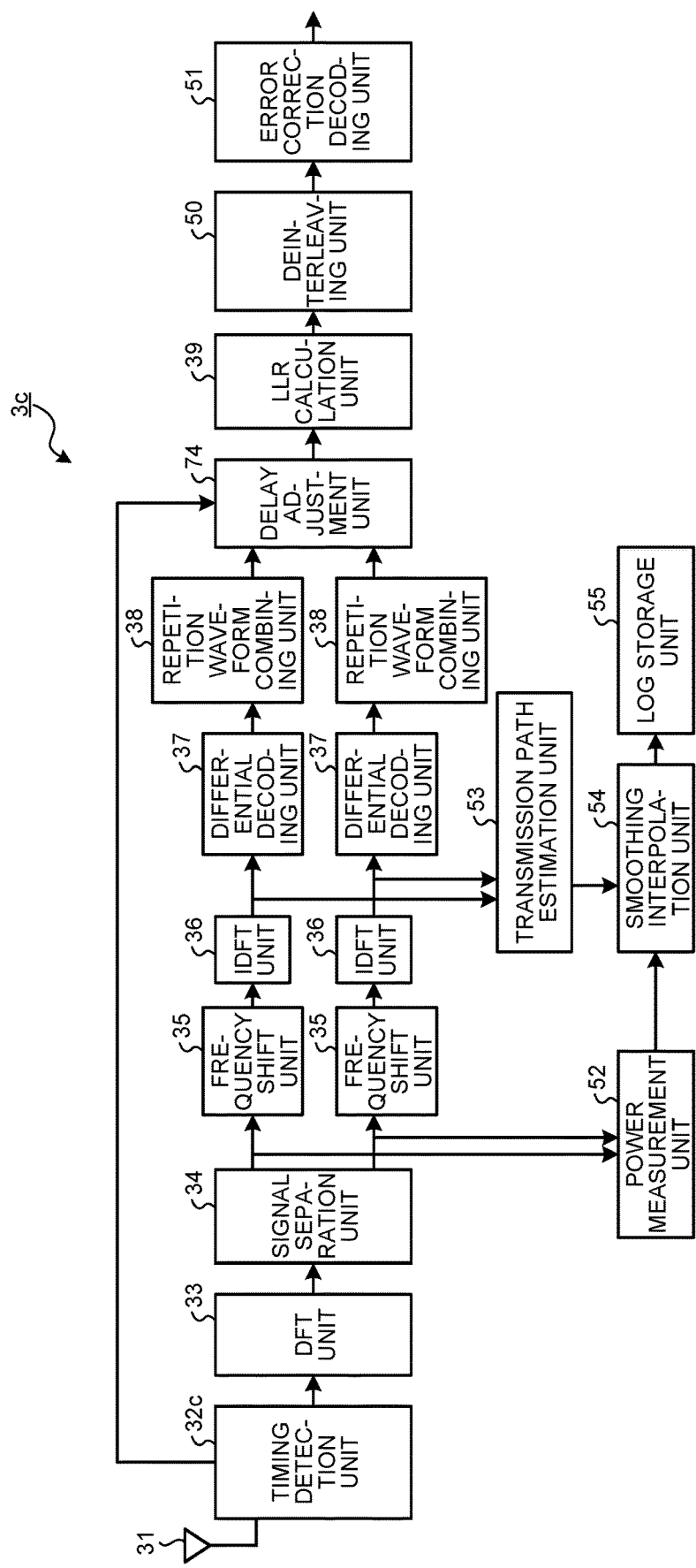
FIG. 18 is a diagram illustrating a configuration of a wireless reception device according to the fourth embodiment of the present disclosure.

FIG. 18 is a diagram illustrating a configuration of a wireless reception device 3c according to the fourth embodiment. The wireless reception device 3c includes a timing detection unit 32c instead of the timing detection unit 32 of the wireless reception device 3, and includes a delay adjustment unit 74 between the repetition waveform combining unit 38 and the LLR calculation unit 39.

The timing detection unit 32c executes inverse matrix correlation or the like on the known signal 41 to detect multipath. Here, because the same known signal 41 is transmitted from the wireless transmission devices 2-1 and 2-2, the difference between the transmission timings is detected as multipath. The timing detection unit 32c inputs the detected reception timing of the known signal 41 to the DFT unit 33 and the delay adjustment unit 74.

The DFT unit 33 applies DFT within the range in which the repetition waveforms 43 of the plurality of wireless transmission devices 2-1 and 2-2 can be periodically handled. Here, DFT is applied according to the delayed wireless transmission device 2-2. After that, the signal separation unit 34 performs signal separation on the obtained frequency domain signal, the frequency shift unit 35 performs frequency shift, and the IDFT unit 36 applies IDFT. In addition, the differential decoding unit 37 executes space-time differential decoding, and the repetition waveform combining unit 38 combines the plurality of repetition waveforms 43. Each of the repetition waveform combining units 38 of the two systems inputs the combined signal to the delay adjustment unit 74. In this example of the transmission of the same data, received data from the two wireless transmission devices 2 are combined in the delay adjustment unit and processed in one system consisting of the LLR calculation unit 39, the deinterleaving unit 50, and the error correction decoding unit 51.

The delay adjustment unit 74 uses the difference between the reception timings of the known signals 41 included in the two signals input from the timing detection unit 32c and correlation processing that uses the relationship of start-end processing to reflect the amount of delay in the space-time differential coding result for the wireless transmission device 2-1, whereby the basic waveform sequence of the wireless transmission device 2-1 and the basic waveform sequence of the wireless transmission device 2-2 are aligned. Because the delay is expressed by a phase rotation in the frequency domain, the delay difference may be corrected in the frequency domain. Further, log accumulation processing can be executed in the same manner as in the first embodiment.

Figure 19:
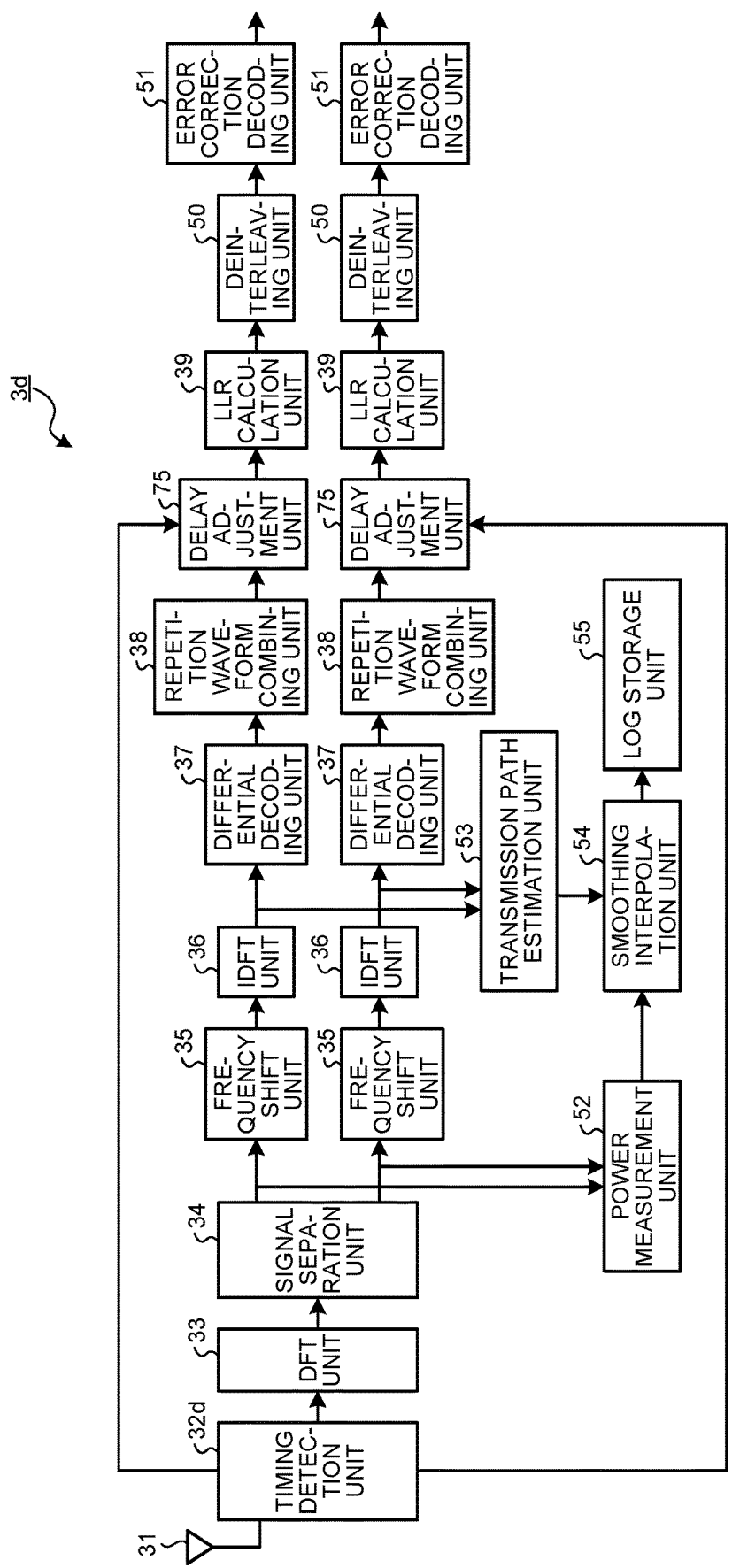
FIG. 19 is a diagram illustrating a configuration of a wireless reception device according to a modification of the fourth embodiment of the present disclosure.

FIG. 19 is a diagram illustrating a configuration of a wireless reception device 3d according to a modification of the fourth embodiment. Hereinafter, the differences from the wireless reception device 3c illustrated in FIG. 18 will be mainly described. While the wireless reception device 3c includes the single delay adjustment unit 74 to which signals are input via the two processing systems from the frequency shift unit 35 through the repetition waveform combining unit 38, the wireless reception device 3d includes delay adjustment units 75 corresponding one-to-one to the two processing systems from the frequency shift unit 35 through the repetition waveform combining unit 38. In addition, a timing detection unit 32d is provided in place of the timing detection unit 32c to input the timing detection result to each of the two delay adjustment units 75. If the plurality of wireless transmission devices 2 transmit the same data, combining processing is performed in the delay adjustment unit. If the plurality of wireless transmission devices 2 transmit different data, a plurality of systems are provided, each consisting of the delay adjustment unit 74, the LLR calculation unit 39, the deinterleaving unit 50, and the error correction decoding unit 51.

Each delay adjustment unit 75 performs correlation processing, estimates the start end of the basic waveform 44, and performs delay adjustment based on the estimation result of the start end position and the delay amount of multipath. With such a configuration, when the plurality of wireless transmission devices 2-1 and 2-2 transmit the same known signal 41 and different data, that is, different repetition waveforms 43, it is possible to measure the received power and interference situation from each of the wireless transmission devices 2-1 and 2-2. In the above description, the plurality of wireless transmission devices 2-1 and 2-2 use the same known signal 41. However, the plurality of wireless transmission devices 2-1 and 2-2 may use different known signals 41.

As described above, according to the fourth embodiment, even when there is a transmission timing difference between the plurality of wireless transmission devices 2-1 and 2-2, the received power and interference situation can be accurately measured while performing data transmission.

A timing error that can occur when the plurality of wireless transmission devices 2 transmit the same data is observed as multipath. However, by using the above-described technique of the fourth embodiment, data transmission can be performed. Therefore, the permissible range of transmission synchronization between transmission stations can be extended. This is advantageous in that GPS-based accurate synchronization between transmission stations can be omitted. In addition, radio waves arriving from a remote transmission station that uses the same frequency can be simultaneously detected as a signal, whereby the arrival of radio waves can be systematically monitored. In this case, the transmitted data differ between the plurality of wireless transmission devices 2.

Fifth Embodiment

In the first to fourth embodiments described above, space-time differential coding is used. The present embodiment describes a configuration for using differential quadrature phase shift keying (DQPSK) to enable the measurement of received power, noise, and interference while performing data transmission based on the premise of delay transmission diversity. Note that the fifth embodiment is based on the assumption that the interference situation measurement frame 61 is prepared in some frame of the superframe 60 as illustrated in FIG. 10.

Figure 20:
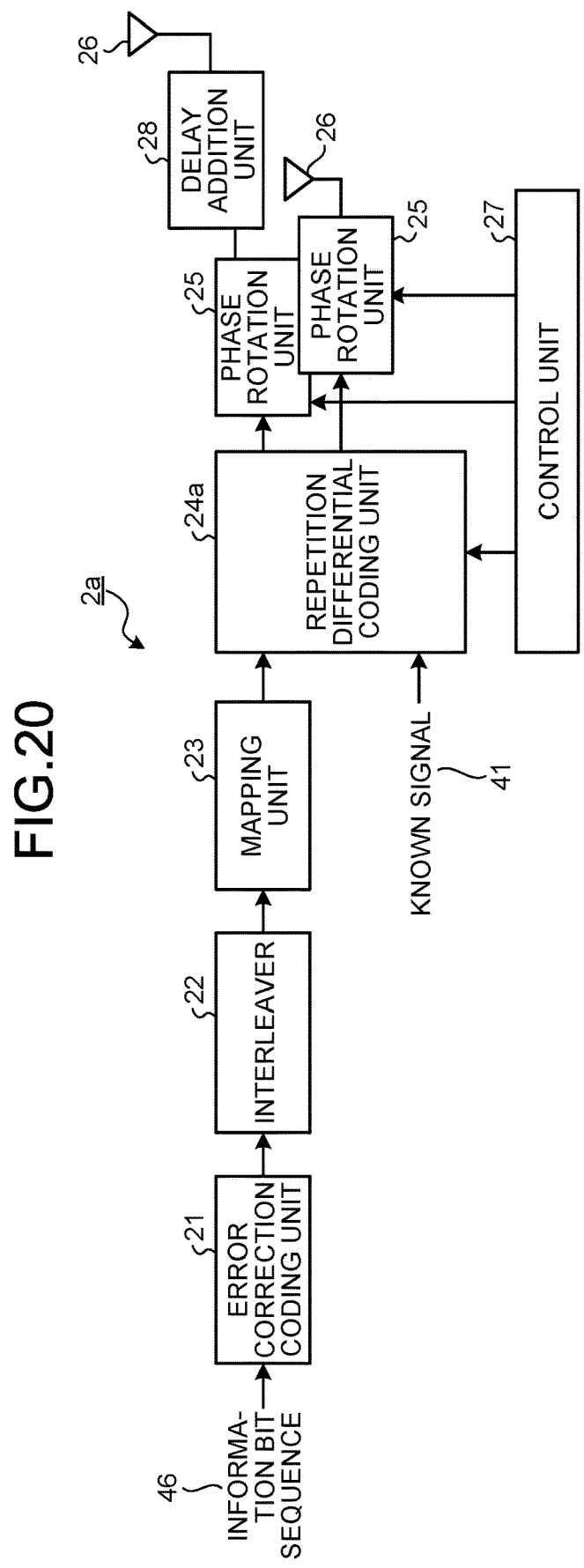
FIG. 20 is a diagram illustrating a configuration of a wireless transmission device according to a fifth embodiment of the present disclosure.

FIG. 20 is a diagram illustrating a configuration of a wireless transmission device 2a according to the fifth embodiment. The wireless transmission device 2a includes a repetition differential coding unit 24a that uses DQPSK, instead of the repetition differential coding unit 24 of the wireless transmission device 2 illustrated in FIG. 4. The wireless transmission device 2a also includes a delay addition unit 28 between one of the two phase rotation units 25 and the transmission antenna 26.

For the interference situation measurement frame 61, the repetition differential coding unit 24a of the wireless transmission device 2a generates repetition waveforms through DQPSK modulation based on predetermined fixed bit sequences, and directs the signal to either of the two systems. The delay addition unit 28 gives a delay of about one symbol to the input signal.

Figure 21:
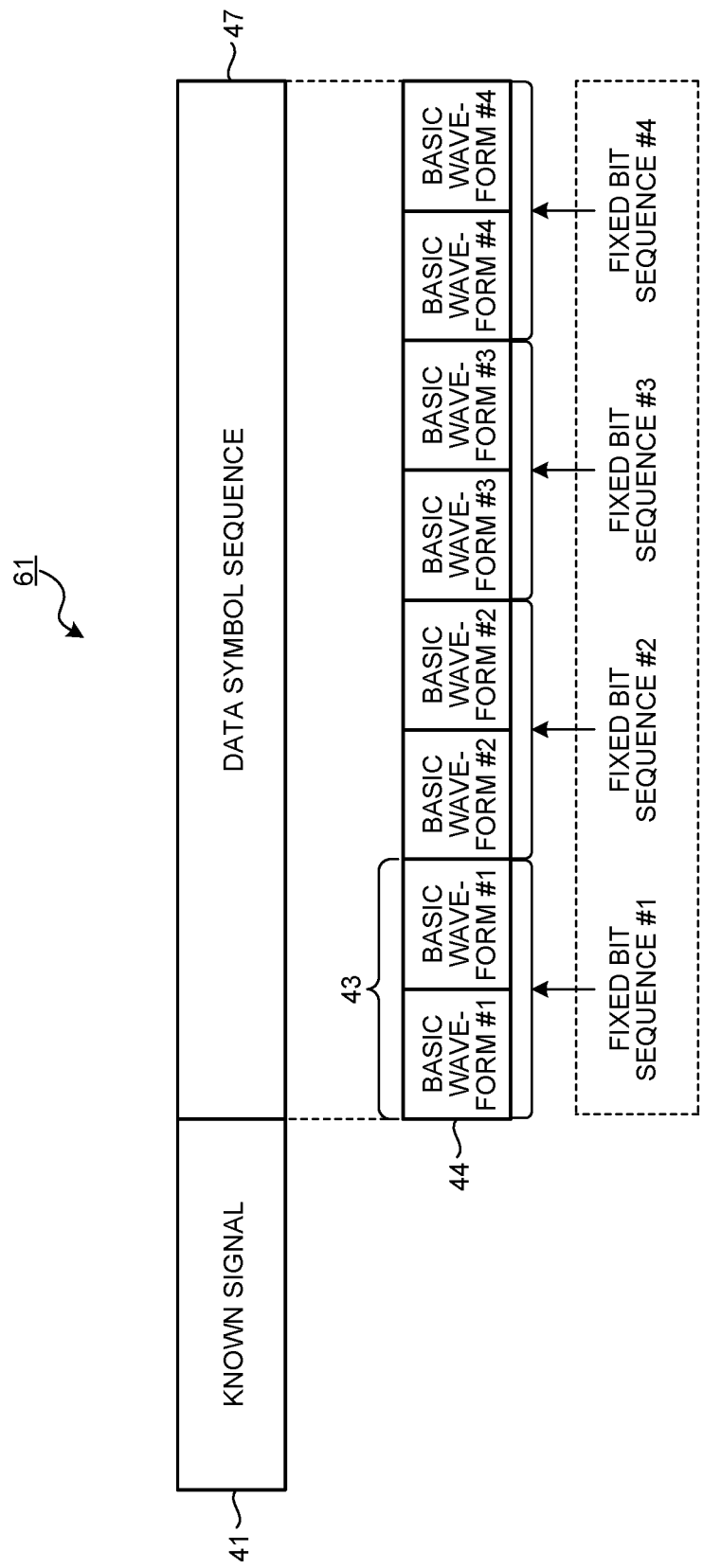
FIG. 21 is a diagram illustrating an example of an interference situation measurement frame included in a superframe that is transmitted by the wireless transmission device illustrated in FIG. 20.

Here, the process in which the repetition differential coding unit 24a generates the repetition waveforms 43 using fixed bit sequences will be described in detail. FIG. 21 is a diagram illustrating an example of the interference situation measurement frame 61 included in the superframe 60 that is transmitted by the wireless transmission device 2a illustrated in FIG. 20. The interference situation measurement frame 61 is composed of the known signal 41 and a data symbol sequence 47. The data symbol sequence 47 includes a plurality of repetition waveforms 43 in which the basic waveform 44 is repeated. The multiple types of repetition waveforms 43 are generated using multiple different types of fixed bit sequences #1 to #4.

The fixed bit sequences #1 to #4 used here need only cause the transmission spectrum to be unevenly distributed to a specific frequency and provide a frequency at which noise and interference can be measured. For example, based on the DQPSK modulation defined by the Association of Radio Industries and Business (ARIB) STD T.61 standard, if the 2-bit values that generate DQPSK in the section of the basic waveform 44 are continuous "00" or continuous "10", the phase difference between symbols of DQPSK is ±π/4, and if the 2-bit values are continuous "01" or continuous "11", the phase difference is ±3π/4. Utilizing this relationship, these can be made into the repetition waveforms 43 of the interference situation measurement frame 61. As a result, assuming that the bandwidth is f, the spectrum is concentrated on specific frequencies of ±1/8f and ±3/8f, and the frequencies at which noise and interference can be measured can be clearly defined.

Referring the two wireless transmission devices 2a as the wireless transmission device 2a-1 and the wireless transmission device 2a-2, a specific allocation example will be described. In the interference situation measurement frame 61 of the wireless transmission device 2a-1, the fixed bit sequence #1 can be the repetition waveform 43 of the basic waveform #1 composed of the 2-bit value "11", the fixed bit sequence #2 can be the repetition waveform 43 of the basic waveform #2 composed of the 2-bit value "10", the fixed bit sequence #3 can be the repetition waveform 43 of the basic waveform #3 composed of the 2-bit value "00", and the fixed bit sequence #4 can be the repetition waveform 43 of the basic waveform #4 composed of the 2-bit value "01".

The plurality of wireless transmission devices 2a transmit different fixed bit sequences at the same time point, thereby enabling interference measurement. For example, for the interference situation measurement frame 61 of the wireless transmission device 2a-2, the head repetition waveform 43 is generated from the fixed bit sequence #3, the second repetition waveform 43 is generated from the fixed bit sequence #4, the third repetition waveform 43 is generated from the fixed bit sequence #1, and the fourth repetition waveform 43 is generated from the fixed bit sequence #2, whereby different fixed bit sequences can be transmitted at the same time point.

Figure 22:
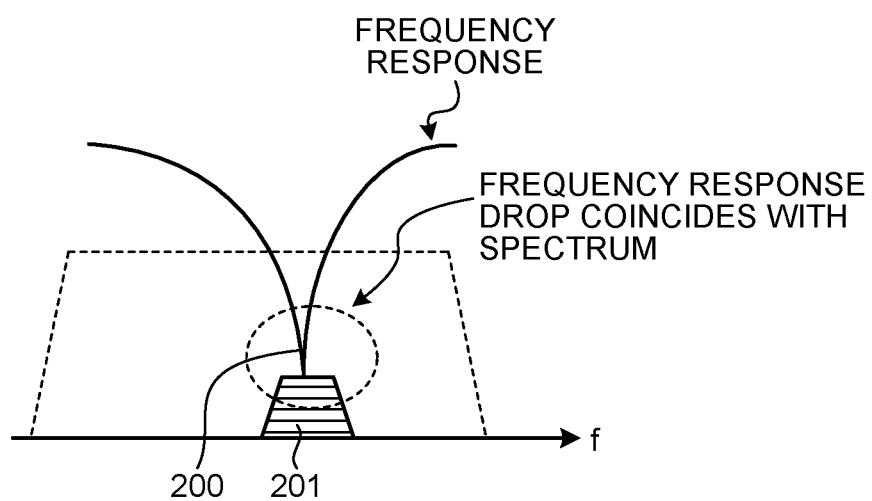
FIG. 22 is a diagram for explaining the problem that occurs when a single fixed bit sequence is used.

FIG. 22 is a diagram for explaining the problem that occurs when a single fixed bit sequence is used. In the one-symbol-delay transmission diversity, there is a frequency at which a frequency response drop occurs within the bandwidth used. In a case where one frame is configured using a single fixed bit sequence, if the frequency at which a frequency response drop 200 occurs coincides with the frequency on which a spectrum 201 is concentrated due to the fixed bits, the received power is observed to be small and the accuracy of measurement is reduced. The frequency at which the frequency response drop 200 occurs depends on the channel state.

Figure 23:
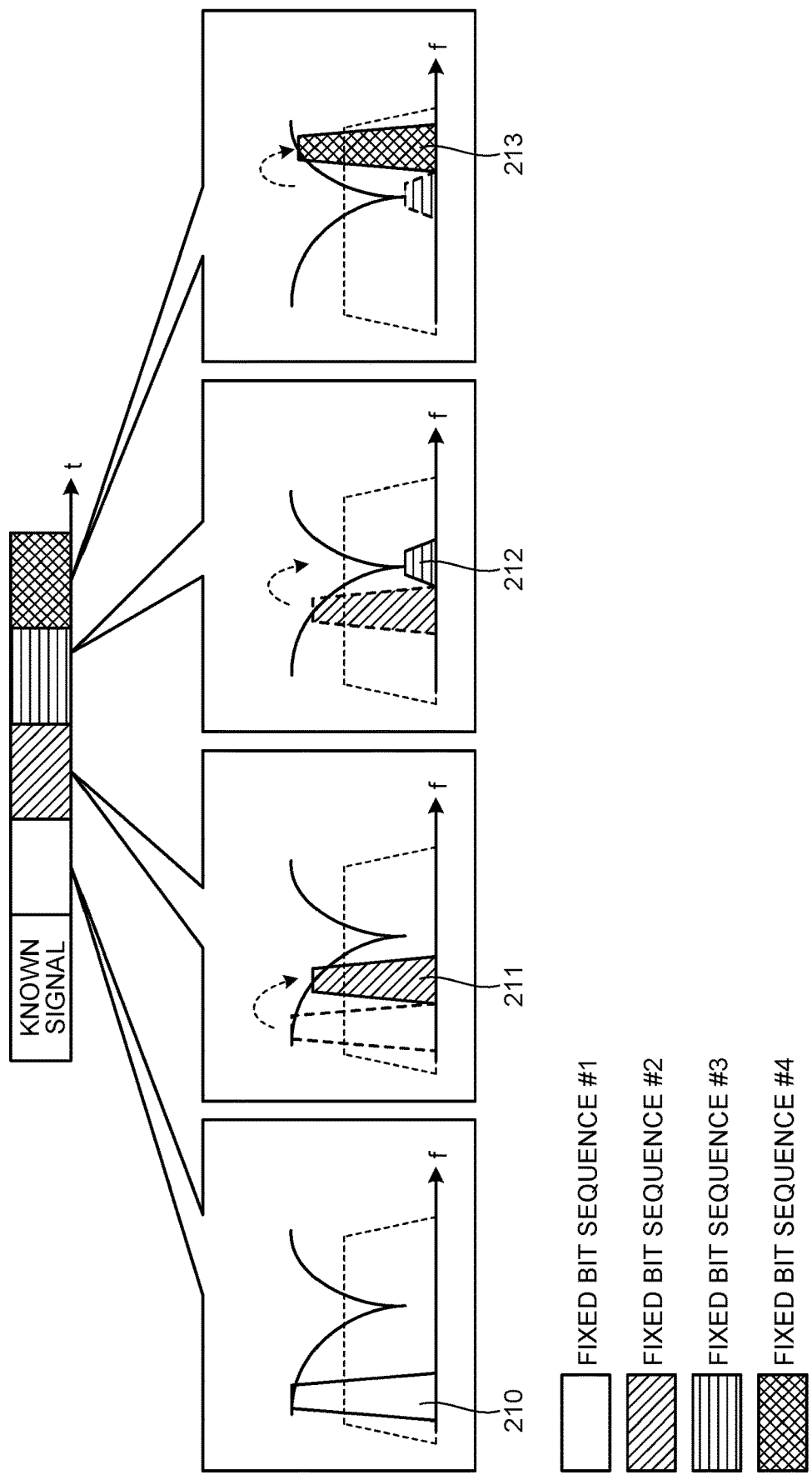
FIG. 23 is a diagram for explaining the advantage of using multiple types of fixed bit sequences.

FIG. 23 is a diagram for explaining the advantage of using multiple types of fixed bit sequences. In a case where the plurality of fixed bit sequences #1 to #4 are used, a spectrum 210 derived from the fixed bit sequence #1, a spectrum 211 derived from the fixed bit sequence #2, a spectrum 212 derived from the fixed bit sequence #3, and a spectrum 213 derived from the fixed bit sequence #4 are concentrated on different frequencies. Therefore, the coincidence with the frequency response drop 200 can be avoided by any of the fixed bit sequences #1 to #4. In addition, the frequency response can be assessed from the received power of any of the fixed bit sequences #1 to #4.

In addition to the example illustrated in FIG. 21, there is another means for assessing the frequency response while avoiding the coincidence of the frequency response drop 200 and a spectrum. This means may involve using one fixed bit sequence and then multiplying multiple types of phase rotation sequences to generate a plurality of repetition waveforms 43. As described in the first to fourth embodiments, the repetition waveform 43 can also be generated in differential phase shift keying (DPSK) by using start-end processing. This can be achieved simply by performing start-end processing with the symbol obtained by conjugating the one-time-preceding differentially coded result at the timing of the start-end processing.

As described above, according to the fifth embodiment, in a wireless communication system that uses DQPSK instead of space-time differential coding, the received power and interference situation can be accurately measured while performing data transmission.

In space-time differential coding, a fixed symbol sequence can be used to similarly enable the spectrum to be unevenly distributed. For example, let S'[k] be the fixed symbol sequence represented by Formula (7) below.

[Formula 7]

$$S'[0] = \begin{bmatrix} 1 & 1 \\ -1 & 1 \end{bmatrix}, S'[k] = \begin{bmatrix} 1 & 0 \\ 0 & 1 \end{bmatrix} (k \neq 0) \qquad (7)$$

The coded sequence obtained through space-time differential coding is expressed by Formula (8) below. By associating the lines of C[k] one-to-one to the transmission antennas and performing frequency conversion in a predetermined section, the signal of each transmission antenna can be separately detected on the frequency axis. By adding a phase rotation sequence thereto, it is possible to implement the same function as in the example of DQPSK.

[Formula 8]

$$C[k] = \begin{bmatrix} 1 & 1 \\ -1 & 1 \end{bmatrix} \qquad (8)$$

According to the first to fifth embodiments described above, if a slot for radio wave observation can be defined by an add-on in the existing system, the current system can be easily configured to enable the assessment of radio wave conditions such as interference between the system and other systems, the planning of transmission stations, and the adjustment of antennas.

Although the first to fifth embodiments describe either an example in which the plurality of wireless transmission devices 2 transmit the same data or an example in which the plurality of wireless transmission devices 2 transmit different data, there is no particular limitation. The technique of each embodiment is applicable to both the case of the same transmission data and the case of different transmission data.

Here, the hardware configurations of the wireless transmission devices 2, 2-1, 2-2, and 2a and the wireless reception devices 3, 3a, 3b, 3c, and 3d according to the first to fifth embodiments will be described.

The transmission antenna 26 of the wireless transmission devices 2, 2-1, 2-2, and 2a and the reception antenna 31 of the wireless reception devices 3, 3a, 3b, 3c, and 3d are antenna elements.

The error correction coding unit 21, the interleaver 22, the mapping unit 23, the repetition differential coding unit 24, the phase rotation unit 25, and the control unit 27 of the wireless transmission devices 2, 2-1, 2-2, and 2a and the delay addition unit 28 of the wireless transmission device 2a are implemented by processing circuitry. The timing detection units 32, 32a, 32c, and 32d, the DFT unit 33, the signal separation units 34 and 34b, the frequency shift unit 35, the IDFT unit 36, the differential decoding unit 37, the repetition waveform combining unit 38, the LLR calculation unit 39, the deinterleaving unit 50, the error correction decoding unit 51, the power measurement units 52 and 52b, the transmission path estimation unit 53, the smoothing interpolation unit 54, the log storage unit 55, the selectors 71 and 72, the synchronization management unit 73, and the delay adjustment units 74 and 75 of the wireless reception devices 3, 3a, 3b, 3c, and 3d are implemented by processing circuitry.

Figure 24:
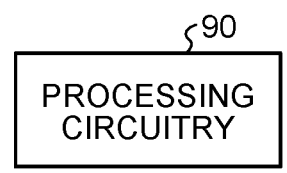
FIG. 24 is a diagram illustrating processing circuitry which is dedicated hardware for implementing the first to fifth embodiments of the present disclosure.

The processing circuitry may be dedicated hardware, or may be a control circuit including a memory and a processor that executes a program stored in the memory. FIG. 24 is a diagram illustrating processing circuitry 90 which is dedicated hardware for implementing the first to fifth embodiments. The processing circuitry 90 is, for example, a single circuit, a composite circuit, a programmed processor, a parallel programmed processor, an application specific integrated circuit (ASIC), a field programmable gate array (FPGA), or a combination thereof.

Figure 25:
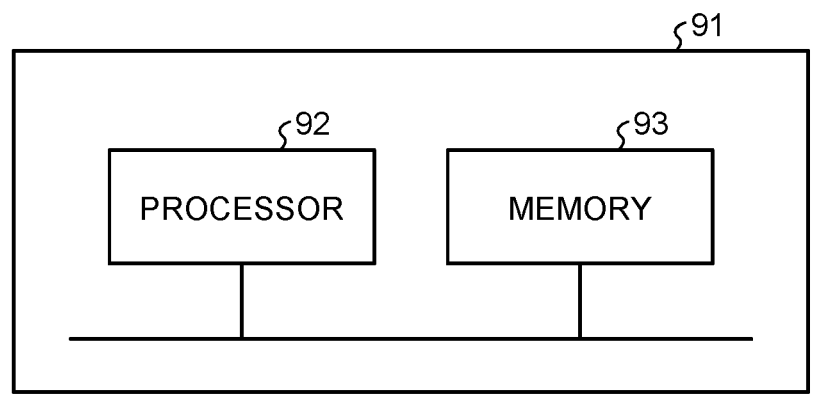
FIG. 25 is a diagram illustrating a control circuit including a processor for implementing the first to fifth embodiments of the present disclosure.

FIG. 25 is a diagram illustrating a control circuit 91 including a processor for implementing the first to fifth embodiments. The control circuit 91 includes a processor 92 and a memory 93. The processor 92 is a central processing unit (CPU), a central processing device, a processing device, an arithmetic device, a microprocessor, a microcomputer, a digital signal processor (DSP), or the like. Examples of the memory 93 include a non-volatile or volatile semiconductor memory, a magnetic disk, a flexible disk, an optical disc, a compact disc, a mini disc, a digital versatile disc (DVD), and the like. Examples of the non-volatile or volatile semiconductor memory include a random access memory (RAM), a read only memory (ROM), a flash memory, an erasable programmable read only memory (EPROM), an electrically erasable programmable read only memory (EEPROM, registered trademark), and the like.

The memory 93 can store a computer program that describes the process of each component of the wireless transmission devices 2, 2-1, 2-2, and 2a and the wireless reception devices 3, 3a, 3b, 3c, and 3d. The processor 92 reads and executes a computer program stored in the memory 93 to implement the function of each component of the wireless transmission devices 2, 2-1, 2-2, and 2a and the wireless reception devices 3, 3a, 3b, 3c, and 3d. The memory 93 is also used as a temporary memory for each process executed by the processor 92.

The configurations described in the above-mentioned embodiments indicate examples. The configurations can be combined with another well-known technique, and some of the configurations can be omitted or changed in a range not departing from the gist.

For example, the system configurations described in the first to fifth embodiments above are examples. There is no limitation on the number of wireless transmission devices 2 and the number of wireless reception devices 3 included in the wireless communication system 1. Similarly, there is no limitation on the number of transmission antennas 26 included in the wireless transmission device 2 and the number of reception antennas 31 included in the wireless reception device 3. Needless to say, the configuration of the wireless transmission device 2 or the wireless reception device 3 can be changed according to the number of transmission or reception antennas.

The wireless transmission device according to the present disclosure can achieve the effect of improving the accuracy of transmission path estimation for measuring the state of interference between a plurality of wireless transmission devices and a plurality of antennas while performing data transmission even in an environment where a wireless reception device moves at high speed.

What is claimed is:

1. A wireless transmission device comprising
a repetition coding circuitry to prepare a basic waveform of a data frame having a length less than a frequency conversion length of a wireless reception device, generate a repetition waveform having a length greater than or equal to the frequency conversion length by repeating the basic waveform a plurality of times, and generate the data frame including the repetition waveform and a known signal, wherein the repetition coding circuitry performs differential coding,
wherein the repetition coding circuitry adjusts a symbol at a predetermined position of each basic waveform included in the repetition waveform such that a differentially coded sequence maintains the repetition waveform.

2. The wireless transmission device according to claim 1, comprising
a phase rotation circuitry to multiply the repetition waveform by a phase rotation sequence.

3. The wireless transmission device according to claim 2, wherein
the one data frame contains a plurality of the repetition waveforms, and
the phase rotation circuitry multiplies each of the repetition waveforms by a different phase rotation sequence.

4. The wireless transmission device according to claim 3, wherein the phase rotation circuitry multiplies the data frame by the phase rotation sequence except at the known signal.

5. The wireless transmission device according to claim 1, wherein the repetition coding circuitry adjusts symbols at a plurality of the predetermined positions included in the repetition waveform such that results of coding on the symbols at the plurality of predetermined positions have a same value.

6. The wireless transmission device according to claim 5, wherein the repetition coding circuitry adjusts the symbol at the predetermined position such that coding on the symbol at the predetermined position results in an identity matrix using a complex conjugate or Hermitian matrix of a one-time-preceding coded signal or one-block-preceding coded signal.

7. The wireless transmission device according to claim 1, wherein the symbol at the predetermined position is a head symbol of the basic waveform.

8. The wireless transmission device according to claim 1, wherein the repetition coding circuitry generates the repetition waveform using a fixed bit sequence that causes a spectrum to be unevenly distributed in a frequency domain and that provides an untransmitted frequency.

9. The wireless transmission device according to claim 8, wherein the repetition coding circuitry generates a plurality of the repetition waveforms using multiple types of the fixed bit sequences in the one data frame.

10. The wireless transmission device according to claim 8, wherein
the repetition coding circuitry generates the repetition waveform using one or more of the fixed bit sequences in the one data frame, and
the wireless transmission device includes a phase rotation circuitry to multiply the repetition waveform by a phase rotation sequence different for each predetermined waveform length.

11. A wireless reception device that receives a signal transmitted by the wireless transmission device according to claim 1, the wireless reception device comprising:
a frequency conversion circuitry to convert a reception signal into a frequency domain signal, the reception signal being a multiplexed signal received from a plurality of the wireless transmission devices;
a signal separation circuitry to separate the reception signal after frequency conversion into a plurality of signals corresponding one-to-one to the wireless transmission devices; and
a time conversion circuitry to convert each of the signals separated into a time domain signal.

12. The wireless reception device according to claim 11, wherein the measurement circuitry records and accumulates a history of measurement results.

13. A remote communication monitoring system comprising
the wireless reception device according to claim 12, wherein
the remote communication monitoring system remotely accesses the history of measurement results accumulated, monitors radio wave conditions, and identifies and resolves a radio wave problem.

14. The wireless reception device according to claim 11, further comprising
a transmission path estimation circuitry to estimate a transmission path matrix using the repetition waveform in which a symbol at a predetermined position of each basic waveform included in the repetition waveform has been adjusted such that a coded sequence maintains the repetition waveform.

15. The wireless reception device according to claim 11, wherein
the reception signal received is a superframe in which an interference measurement frame having one or more repetition waveforms is inserted into a plurality of the data frames, and
the wireless reception device includes:
an interference measurement frame processing circuit to perform demodulation processing and interference measurement processing on the interference measurement frame;
a selector capable of directing the reception signal to the interference measurement frame processing circuit;
a frame synchronization circuitry to detect reception of the interference measurement frame; and
a controller to, in response to the frame synchronization circuitry detecting reception of the interference measurement frame, instruct the selector to direct the reception signal to the interference measurement frame processing circuit.

16. The wireless reception device according to claim 11, comprising:
a timing detection circuitry to estimate a frame timing and a delay amount of each of the plurality of signals corresponding one-to-one to the wireless transmission devices; and
a delay adjustment circuitry to correct delay using the delay amount estimated by the timing detection circuitry.

17. The wireless reception device according to claim 16, wherein the delay adjustment circuitry decodes the repetition waveform included in each of the plurality of signals corresponding one-to-one to the wireless transmission devices, then estimates a start end of the basic waveform included in the repetition waveform decoded, and corrects the delay using an estimation result of the start end and the delay amount estimated by the timing detection circuitry.

18. A wireless communication method for a wireless reception device to receive a multiplexed signal from a plurality of wireless transmission devices, wherein
the wireless communication method includes, by each of the plurality of wireless transmission devices:
generating a repetition waveform by repeating a basic waveform of a data frame a plurality of times, the repetition waveform having a length greater than or equal to a frequency conversion length of the wireless reception device, the basic waveform having a length less than the frequency conversion length;
adjusting a symbol at a predetermined position of each basic waveform included in the repetition waveform such that a differentially coded sequence maintains the repetition waveform;
generating a data frame including the repetition waveform and a known signal; and
transmitting a signal including the data frame, and
the wireless communication method includes, by the wireless reception device:
receiving a reception signal transmitted by the plurality of wireless transmission devices, the reception signal being the multiplexed signal;
converting the reception signal multiplexed into a frequency domain signal;
separating the reception signal after frequency conversion into a plurality of signals corresponding one-to-one to the wireless transmission devices;
converting each of the signals separated into a time domain signal; and
decoding a repetition waveform included in the time domain signal obtained through conversion.

\* \* \* \* \*